United States Patent
Gangi

(10) Patent No.: US 8,225,995 B1
(45) Date of Patent: Jul. 24, 2012

(54) RETAIL POINT-OF-TRANSACTION SYSTEM, PROGRAM PRODUCTS, AND RELATED METHODS TO PROVIDE A CUSTOMIZED SET OF IDENTIFICATION DATA TO FACILITATE A TRANSACTION USING ELECTRONIC COUPONS

(76) Inventor: Frank Joseph Gangi, Fairview, TX (US)

(*) Notice: Subject to any disclaimer, the term of this patent is extended or adjusted under 35 U.S.C. 154(b) by 0 days.

(21) Appl. No.: 12/880,035

(22) Filed: Sep. 10, 2010

Related U.S. Application Data

(63) Continuation of application No. 12/359,927, filed on Jan. 26, 2009, now Pat. No. 7,828,208, which is a continuation of application No. 11/929,592, filed on Oct. 30, 2007, now Pat. No. 7,516,886, which is a continuation of application No. 11/394,314, filed on Mar. 30, 2006, now Pat. No. 7,357,312, which is a continuation-in-part of application No. 11/130,765, filed on May 17, 2005, now Pat. No. 7,083,087, which is a continuation of application No. 10/052,405, filed on Jan. 17, 2002, now Pat. No. 6,938,821, which is a continuation-in-part of application No. 09/664,205, filed on Sep. 18, 2000, now Pat. No. 6,402,029, which is a continuation-in-part of application No. 09/618,407, filed on Jul. 18, 2000, now Pat. No. 6,293,462, which is a continuation of application No. 09/087,193, filed on May 29, 1998, now Pat. No. 6,131,811.

(51) Int. Cl.
*G06F 7/08* (2006.01)
(52) U.S. Cl. ........ 235/381; 235/492; 235/380; 235/383; 235/379
(58) Field of Classification Search .................. 235/380, 235/492, 381, 383, 379; 705/70–75
See application file for complete search history.

(56) References Cited

U.S. PATENT DOCUMENTS
3,845,277 A   10/1974   Voss et al.
(Continued)

FOREIGN PATENT DOCUMENTS
AU       732877 B2      10/1998
(Continued)

OTHER PUBLICATIONS

"The History of Frequent Flyer Programs" From SmarterTravel, http://wiki.smartertravel.com/index.php/The_History_of_Frequent_Flyer_Programs, 2 pages.
(Continued)

*Primary Examiner* — Kristy A Haupt
(74) *Attorney, Agent, or Firm* — Slater & Matsil, L.L.P.

(57) ABSTRACT

Retail point-of-transaction systems, program products, and related computer implemented methods to provide a customized set of identification data to facilitate a retail sales point-of-sale transaction which includes the use of one or more electronic coupons is provided. The retail point-of-sale system can include a computer having memory and configured to facilitate one or more transactions each of which include the use of one or more electronic coupons through a retail point-of-transaction terminal positioned remote from, and adapted to be in communication with, the computer. The computer can also include a set of instructions that when executed by the computer cause the computer to redeem one or more electronic coupons for one or more retail transactions responsive to a customized set of identification data provided by the computer responsive to a data profile derived from a set of personal data of at least one of a plurality of remotely positioned users.

12 Claims, 8 Drawing Sheets

U.S. PATENT DOCUMENTS

| | | |
|---|---|---|
| 4,016,405 A | 4/1977 | McCune et al. |
| 4,102,493 A | 7/1978 | Moreno |
| 4,214,230 A | 7/1980 | Fak et al. |
| 4,234,932 A | 11/1980 | Gorgens |
| 4,253,017 A | 2/1981 | Whitehead |
| 4,314,352 A | 2/1982 | Fought |
| 4,390,968 A | 6/1983 | Hennessy et al. |
| 4,437,130 A | 3/1984 | Hennessy et al. |
| 4,438,326 A | 3/1984 | Uchida |
| 4,443,027 A | 4/1984 | McNeely et al. |
| 4,458,142 A | 7/1984 | Bernstein |
| 4,614,861 A | 9/1986 | Pavlov et al. |
| 4,634,845 A | 1/1987 | Hale et al. |
| 4,650,978 A | 3/1987 | Hudson et al. |
| 4,679,236 A | 7/1987 | Davies |
| 4,701,601 A | 10/1987 | Francini et al. |
| 4,705,211 A | 11/1987 | Honda et al. |
| 4,707,594 A | 11/1987 | Roth |
| 4,742,351 A | 5/1988 | Suzuki |
| 4,755,940 A | 7/1988 | Brachtl et al. |
| 4,772,782 A | 9/1988 | Nonat |
| 4,791,283 A | 12/1988 | Burkhardt |
| 4,825,045 A | 4/1989 | Humble |
| 4,837,422 A | 6/1989 | Dethloff et al. |
| 4,837,822 A | 6/1989 | Crosley et al. |
| 4,849,613 A | 7/1989 | Eisele |
| 4,868,376 A | 9/1989 | Lessin et al. |
| 4,872,113 A | 10/1989 | Dinerstein |
| 4,876,592 A | 10/1989 | Von Kohorn |
| 4,882,675 A | 11/1989 | Nichtberger et al. |
| 4,908,761 A | 3/1990 | Tai |
| 4,910,672 A | 3/1990 | Off et al. |
| 4,918,631 A | 4/1990 | Hara et al. |
| 4,926,255 A | 5/1990 | Von Kohorn |
| 4,926,480 A | 5/1990 | Chaum |
| 4,928,001 A | 5/1990 | Masada |
| 4,949,256 A | 8/1990 | Humble |
| 4,959,788 A | 9/1990 | Nagata et al. |
| 4,960,982 A | 10/1990 | Takahira |
| 4,990,759 A | 2/1991 | Gloton et al. |
| 4,996,642 A | 2/1991 | Hey |
| 5,008,519 A | 4/1991 | Cunningham et al. |
| 5,010,237 A | 4/1991 | Kawana |
| 5,034,807 A | 7/1991 | Von Kohorn |
| 5,053,957 A | 10/1991 | Suzuki |
| 5,056,019 A | 10/1991 | Schultz et al. |
| 5,057,915 A | 10/1991 | Von Kohorn |
| 5,091,634 A | 2/1992 | Finch et al. |
| 5,095,196 A | 3/1992 | Miyata |
| 5,117,355 A | 5/1992 | McCarthy |
| 5,128,752 A | 7/1992 | Von Kohorn |
| 5,130,519 A | 7/1992 | Bush et al. |
| 5,135,095 A | 8/1992 | Kocznar et al. |
| 5,157,247 A | 10/1992 | Takahira |
| 5,168,520 A | 12/1992 | Weiss |
| 5,173,851 A | 12/1992 | Off et al. |
| 5,176,224 A | 1/1993 | Spector |
| 5,185,695 A | 2/1993 | Pruchnicki |
| 5,192,947 A | 3/1993 | Neustein |
| 5,193,056 A | 3/1993 | Boes |
| 5,201,010 A | 4/1993 | Deaton et al. |
| 5,202,826 A | 4/1993 | McCarthy |
| 5,220,501 A | 6/1993 | Lawlor et al. |
| 5,227,874 A | 7/1993 | Von Kohorn |
| 5,245,533 A | 9/1993 | Marshall |
| 5,249,044 A | 9/1993 | Von Kohorn |
| 5,276,311 A | 1/1994 | Hennige |
| 5,283,734 A | 2/1994 | Von Kohorn |
| 5,285,278 A | 2/1994 | Holman |
| 5,287,181 A | 2/1994 | Holman |
| 5,287,268 A | 2/1994 | McCarthy |
| 5,305,195 A | 4/1994 | Murphy |
| 5,305,197 A | 4/1994 | Axler et al. |
| 5,317,636 A | 5/1994 | Vizcaino |
| 5,327,508 A | 7/1994 | Deaton et al. |
| 5,353,218 A | 10/1994 | De Lapa et al. |
| 5,353,219 A | 10/1994 | Mueller et al. |
| 5,368,129 A | 11/1994 | Von Kohorn |
| 5,371,797 A | 12/1994 | Bocinsky, Jr. |
| 5,373,558 A | 12/1994 | Chaum |
| 5,375,037 A | 12/1994 | Le Roux |
| 5,380,991 A | 1/1995 | Valencia et al. |
| 5,412,192 A | 5/1995 | Hoss |
| 5,420,606 A | 5/1995 | Begum et al. |
| 5,426,283 A | 6/1995 | Berthozat et al. |
| 5,434,398 A | 7/1995 | Goldberg |
| 5,434,919 A | 7/1995 | Chaum |
| 5,438,186 A | 8/1995 | Nair et al. |
| 5,440,108 A | 8/1995 | Tran et al. |
| 5,444,616 A | 8/1995 | Nair et al. |
| 5,448,047 A | 9/1995 | Nair et al. |
| 5,455,407 A | 10/1995 | Rosen |
| 5,459,306 A | 10/1995 | Stein et al. |
| 5,471,045 A | 11/1995 | Geronimi |
| 5,471,669 A | 11/1995 | Lidman |
| 5,473,690 A | 12/1995 | Grimonprez et al. |
| 5,481,094 A | 1/1996 | Suda |
| 5,483,049 A | 1/1996 | Schulze, Jr. |
| 5,484,998 A | 1/1996 | Bejnar et al. |
| 5,497,411 A | 3/1996 | Pellerin |
| 5,502,636 A | 3/1996 | Clarke |
| 5,504,675 A | 4/1996 | Cragun et al. |
| 5,513,102 A | 4/1996 | Auriemma |
| 5,515,098 A | 5/1996 | Carles |
| 5,528,490 A | 6/1996 | Hill |
| 5,538,442 A | 7/1996 | Okada |
| 5,557,518 A | 9/1996 | Rosen |
| 5,557,721 A | 9/1996 | Fite et al. |
| 5,568,121 A | 10/1996 | Lamensdorf |
| 5,576,951 A | 11/1996 | Lockwood |
| 5,578,808 A | 11/1996 | Taylor |
| 5,583,763 A | 12/1996 | Atcheson et al. |
| 5,585,787 A | 12/1996 | Wallerstein |
| 5,585,866 A | 12/1996 | Miller et al. |
| 5,590,038 A | 12/1996 | Petroda |
| 5,590,197 A | 12/1996 | Chen et al. |
| 5,592,560 A | 1/1997 | Deaton et al. |
| 5,612,868 A | 3/1997 | Off et al. |
| 5,615,342 A | 3/1997 | Johnson |
| 5,621,812 A | 4/1997 | Deaton et al. |
| 5,623,552 A | 4/1997 | Lane |
| 5,625,776 A | 4/1997 | Johnson |
| 5,627,355 A | 5/1997 | Rahman et al. |
| 5,638,457 A | 6/1997 | Deaton et al. |
| 5,642,484 A | 6/1997 | Harrison, III et al. |
| 5,644,723 A | 7/1997 | Deaton et al. |
| 5,649,114 A | 7/1997 | Deaton et al. |
| 5,655,008 A | 8/1997 | Futch et al. |
| 5,657,317 A | 8/1997 | Mahany et al. |
| 5,665,953 A | 9/1997 | Mazzamuto et al. |
| 5,671,280 A | 9/1997 | Rosen |
| 5,689,247 A | 11/1997 | Welner |
| 5,697,844 A | 12/1997 | Von Kohorn |
| 5,708,782 A | 1/1998 | Larson et al. |
| 5,710,886 A | 1/1998 | Christensen et al. |
| 5,710,887 A | 1/1998 | Chelliah et al. |
| 5,715,399 A | 2/1998 | Bezos |
| 5,717,923 A | 2/1998 | Dedrick |
| 5,724,521 A | 3/1998 | Dedrick |
| 5,727,153 A | 3/1998 | Powell |
| 5,734,823 A | 3/1998 | Saigh et al. |
| 5,745,555 A | 4/1998 | Mark |
| 5,748,737 A | 5/1998 | Daggar |
| 5,754,652 A | 5/1998 | Wilfong |
| 5,754,653 A | 5/1998 | Canfield |
| 5,754,656 A | 5/1998 | Nishioka et al. |
| 5,754,938 A | 5/1998 | Herz et al. |
| 5,758,257 A | 5/1998 | Herz et al. |
| 5,761,309 A | 6/1998 | Ohashi et al. |
| 5,761,648 A | 6/1998 | Golden et al. |
| 5,761,649 A | 6/1998 | Hill |
| 5,767,896 A | 6/1998 | Nemirofsky |
| 5,773,954 A | 6/1998 | VanHorn |
| 5,774,868 A | 6/1998 | Cragun et al. |
| 5,789,732 A | 8/1998 | McMahon et al. |
| 5,790,677 A | 8/1998 | Fox et al. |
| 5,791,991 A | 8/1998 | Small |

| | | | | | | |
|---|---|---|---|---|---|---|
| 5,806,044 A | 9/1998 | Powell | | 6,078,888 A | 6/2000 | Johnson, Jr. |
| 5,812,937 A | 9/1998 | Takahisa et al. | | 6,078,902 A | 6/2000 | Schenkler |
| 5,818,030 A | 10/1998 | Reyes | | 6,089,451 A | 7/2000 | Krause |
| 5,821,513 A | 10/1998 | O'Hagan et al. | | 6,092,090 A | 7/2000 | Payne et al. |
| 5,825,871 A | 10/1998 | Mark | | 6,098,053 A | 8/2000 | Slater |
| 5,831,862 A | 11/1998 | Hetrick et al. | | 6,101,477 A | 8/2000 | Hohle et al. |
| 5,832,457 A | 11/1998 | O'Brien et al. | | 6,101,485 A | 8/2000 | Fortenberry et al. |
| 5,834,747 A | 11/1998 | Cooper | | 6,102,406 A | 8/2000 | Miles et al. |
| 5,834,756 A | 11/1998 | Gutman et al. | | 6,108,640 A | 8/2000 | Slotznick |
| 5,844,219 A | 12/1998 | Wallner | | 6,111,953 A | 8/2000 | Walker et al. |
| 5,844,497 A | 12/1998 | Gray | | 6,112,981 A | 9/2000 | McCall |
| 5,850,442 A | 12/1998 | Muftic | | 6,118,784 A | 9/2000 | Tsuchiya et al. |
| 5,855,007 A | 12/1998 | Jovicic et al. | | 6,119,933 A | 9/2000 | Wong et al. |
| 5,867,208 A | 2/1999 | McLaren | | 6,122,625 A | 9/2000 | Rosen |
| 5,870,030 A | 2/1999 | DeLuca et al. | | 6,123,259 A | 9/2000 | Ogasawara |
| 5,883,810 A | 3/1999 | Franklin et al. | | 6,128,602 A | 10/2000 | Northington et al. |
| 5,884,271 A | 3/1999 | Pitroda | | 6,129,274 A | 10/2000 | Suzuki |
| 5,887,271 A | 3/1999 | Powell | | 6,131,811 A | 10/2000 | Gangi |
| 5,895,903 A | 4/1999 | Abe et al. | | 6,132,799 A | 10/2000 | Corniglion et al. |
| 5,903,874 A | 5/1999 | Leonard et al. | | 6,160,994 A | 12/2000 | Wiedeman |
| 5,905,246 A | 5/1999 | Fajkowski | | 6,163,771 A | 12/2000 | Walker et al. |
| 5,907,830 A | 5/1999 | Engel et al. | | D436,620 S | 1/2001 | Webb et al. |
| 5,913,203 A | 6/1999 | Wong et al. | | 6,178,408 B1 | 1/2001 | Copple et al. |
| 5,915,226 A | 6/1999 | Martineau | | 6,188,309 B1 | 2/2001 | Levine |
| 5,917,168 A | 6/1999 | Nakamura et al. | | 6,189,787 B1 | 2/2001 | Dorf |
| 5,918,213 A * | 6/1999 | Bernard et al. ............ 705/26.35 | | 6,205,436 B1 | 3/2001 | Rosen |
| 5,923,016 A | 7/1999 | Fredregill et al. | | 6,206,293 B1 | 3/2001 | Gutman et al. |
| 5,936,226 A | 8/1999 | Aucsmith | | RE37,122 E | 4/2001 | Levine et al. |
| 5,936,541 A | 8/1999 | Stambler | | 6,213,403 B1 | 4/2001 | Bates, III |
| 5,937,394 A | 8/1999 | Wong et al. | | 6,215,665 B1 | 4/2001 | Martin |
| 5,940,511 A | 8/1999 | Wilfong | | 6,224,109 B1 | 5/2001 | Yang |
| 5,948,061 A | 9/1999 | Merriman et al. | | 6,227,447 B1 | 5/2001 | Campisano |
| 5,953,710 A | 9/1999 | Fleming | | 6,230,977 B1 | 5/2001 | Johnson |
| 5,955,961 A | 9/1999 | Wallerstein | | 6,234,389 B1 | 5/2001 | Valliani et al. |
| 5,956,699 A | 9/1999 | Wong et al. | | 6,256,614 B1 | 7/2001 | Wecker et al. |
| 5,970,469 A | 10/1999 | Scroggie et al. | | 6,257,486 B1 | 7/2001 | Teicher et al. |
| RE36,365 E | 11/1999 | Levine et al. | | 6,282,522 B1 | 8/2001 | Davis et al. |
| 5,979,757 A | 11/1999 | Tracy et al. | | 6,292,785 B1 | 9/2001 | McEvoy et al. |
| 5,987,498 A | 11/1999 | Athing et al. | | 6,292,786 B1 | 9/2001 | Deaton et al. |
| 5,991,412 A | 11/1999 | Wissenburgh et al. | | 6,293,462 B1 | 9/2001 | Gangi |
| 5,992,888 A | 11/1999 | North et al. | | 6,298,329 B1 | 10/2001 | Walker et al. |
| 5,999,914 A | 12/1999 | Blinn et al. | | 6,311,171 B1 | 10/2001 | Dent |
| 5,999,932 A | 12/1999 | Paul | | 6,321,208 B1 * | 11/2001 | Barnett et al. ............ 705/14.36 |
| 6,000,832 A | 12/1999 | Franklin et al. | | 6,324,525 B1 | 11/2001 | Kramer et al. |
| 6,003,763 A | 12/1999 | Gallagher et al. | | 6,324,526 B1 | 11/2001 | D'Agostino |
| 6,009,410 A | 12/1999 | LeMole et al. | | 6,326,982 B1 | 12/2001 | Wu et al. |
| 6,009,411 A | 12/1999 | Kepecs | | 6,327,300 B1 | 12/2001 | Souissi et al. |
| 6,012,634 A | 1/2000 | Brogan et al. | | 6,327,578 B1 | 12/2001 | Linehan |
| 6,012,636 A | 1/2000 | Smith | | 6,330,543 B1 | 12/2001 | Kepecs |
| 6,014,634 A | 1/2000 | Scroggie et al. | | 6,332,124 B1 | 12/2001 | Loeb et al. |
| 6,018,717 A | 1/2000 | Lee et al. | | 6,332,134 B1 | 12/2001 | Foster |
| 6,024,288 A | 2/2000 | Gottlich et al. | | 6,336,098 B1 | 1/2002 | Fortenberry et al. |
| 6,026,369 A | 2/2000 | Capek | | 6,336,099 B1 | 1/2002 | Barnett et al. |
| 6,026,370 A | 2/2000 | Jermyn | | 6,339,766 B1 | 1/2002 | Gephart |
| 6,029,142 A | 2/2000 | Hill | | 6,343,284 B1 | 1/2002 | Ishikawa et al. |
| 6,029,150 A | 2/2000 | Kravitz | | 6,354,492 B1 | 3/2002 | Powell et al. |
| 6,029,890 A | 2/2000 | Austin | | 6,356,905 B1 | 3/2002 | Gershman et al. |
| 6,032,134 A | 2/2000 | Weissman | | 6,370,488 B1 | 4/2002 | Beaudoin et al. |
| 6,036,086 A | 3/2000 | Sizer, II et al. | | 6,370,513 B1 | 4/2002 | Kolawa et al. |
| 6,038,492 A | 3/2000 | Nichols et al. | | 6,385,591 B1 | 5/2002 | Mankoff |
| 6,038,551 A | 3/2000 | Barlow et al. | | 6,394,343 B1 | 5/2002 | Berg et al. |
| 6,039,244 A | 3/2000 | Finsterwald | | 6,402,029 B1 | 6/2002 | Gangi |
| 6,041,309 A | 3/2000 | Laor | | 6,424,950 B1 | 7/2002 | Weller |
| 6,047,268 A | 4/2000 | Bartoli et al. | | 6,425,523 B1 | 7/2002 | Shem-Ur et al. |
| 6,049,779 A | 4/2000 | Berkson | | 6,456,984 B1 | 9/2002 | Demoff et al. |
| 6,050,493 A | 4/2000 | Fertig | | 6,470,233 B1 | 10/2002 | Johnson, Jr. |
| 6,052,709 A | 4/2000 | Paul | | 6,473,500 B1 | 10/2002 | Risafi et al. |
| 6,055,513 A | 4/2000 | Katz et al. | | 6,497,360 B1 | 12/2002 | Schulze, Jr. |
| 6,055,573 A | 4/2000 | Gardenswartz et al. | | 6,505,772 B1 | 1/2003 | Mollett et al. |
| 6,061,660 A | 5/2000 | Eggleston et al. | | 6,505,773 B1 * | 1/2003 | Palmer et al. ................ 235/380 |
| 6,067,524 A | 5/2000 | Byerly et al. | | 6,518,927 B2 | 2/2003 | Schremmer et al. |
| 6,068,183 A | 5/2000 | Freeman et al. | | 6,549,912 B1 | 4/2003 | Chen |
| 6,068,184 A | 5/2000 | Barnett | | 6,574,730 B1 | 6/2003 | Bissell et al. |
| 6,068,192 A | 5/2000 | McCabe et al. | | 6,575,835 B1 | 6/2003 | Mishina et al. |
| 6,070,147 A | 5/2000 | Harms et al. | | 6,581,827 B2 | 6/2003 | Welton |
| 6,072,870 A | 6/2000 | Nguyen et al. | | 6,584,448 B1 | 6/2003 | Laor |
| 6,075,861 A | 6/2000 | Miller, II | | 6,588,658 B1 | 7/2003 | Blank |
| 6,075,971 A | 6/2000 | Williams et al. | | 6,592,044 B1 | 7/2003 | Wong et al. |
| 6,076,068 A | 6/2000 | DeLapa et al. | | 6,607,127 B2 | 8/2003 | Wong |

| | | |
|---|---|---|
| 6,609,654 B1 | 8/2003 | Anderson et al. |
| 6,616,049 B1 | 9/2003 | Barkan et al. |
| 6,626,356 B2 | 9/2003 | Davenport et al. |
| 6,631,849 B2 | 10/2003 | Blossom |
| 6,636,833 B1 | 10/2003 | Flitcroft et al. |
| 6,658,389 B1 | 12/2003 | Alpdemir |
| 6,679,421 B2 * | 1/2004 | Shin et al. ............... 235/375 |
| 6,685,088 B1 | 2/2004 | Royer et al. |
| 6,691,915 B1 | 2/2004 | Thaxton et al. |
| 6,719,634 B2 | 4/2004 | Mishina et al. |
| 6,732,919 B2 | 5/2004 | Macklin et al. |
| 6,739,514 B2 | 5/2004 | Sanders et al. |
| 6,755,341 B1 | 6/2004 | Wong et al. |
| 6,755,344 B1 | 6/2004 | Mollett et al. |
| 6,761,309 B2 | 7/2004 | Stoutenburg et al. |
| 6,775,539 B2 | 8/2004 | Deshpande |
| 6,789,189 B2 | 9/2004 | Wheeler et al. |
| 6,805,288 B2 | 10/2004 | Routhenstein et al. |
| 6,814,282 B2 | 11/2004 | Seifert et al. |
| 6,820,199 B2 | 11/2004 | Wheeler et al. |
| 6,827,260 B2 | 12/2004 | Stoutenburg et al. |
| 6,834,270 B1 | 12/2004 | Pagani et al. |
| 6,847,953 B2 | 1/2005 | Kuo |
| 6,851,054 B2 | 2/2005 | Wheeler et al. |
| 6,857,566 B2 | 2/2005 | Wankmueller |
| 6,880,751 B2 | 4/2005 | Okamura et al. |
| 6,886,742 B2 | 5/2005 | Stoutenburg et al. |
| 6,889,198 B2 | 5/2005 | Kawan |
| 6,892,302 B2 | 5/2005 | Wheeler et al. |
| 6,915,271 B1 | 7/2005 | Meyer et al. |
| 6,915,279 B2 | 7/2005 | Hogan et al. |
| 6,915,430 B2 | 7/2005 | Wheeler et al. |
| 6,922,673 B2 | 7/2005 | Karas et al. |
| 6,932,270 B1 | 8/2005 | Fajkowski |
| 6,935,559 B2 | 8/2005 | Mollett et al. |
| 6,938,156 B2 | 8/2005 | Wheeler et al. |
| 6,938,821 B2 | 9/2005 | Gangi |
| 6,950,940 B2 | 9/2005 | Wheeler et al. |
| 6,952,773 B2 | 10/2005 | Wheeler et al. |
| 6,957,336 B2 | 10/2005 | Wheeler et al. |
| 6,959,381 B2 | 10/2005 | Wheeler et al. |
| 6,978,369 B2 | 12/2005 | Wheeler et al. |
| 6,981,154 B2 | 12/2005 | Wheeler et al. |
| 6,990,470 B2 | 1/2006 | Hogan et al. |
| 6,991,157 B2 | 1/2006 | Bishop et al. |
| 6,991,160 B2 | 1/2006 | Demere |
| 6,993,510 B2 | 1/2006 | Guy et al. |
| 7,003,479 B2 | 2/2006 | Cowell et al. |
| 7,003,493 B2 | 2/2006 | Weichert et al. |
| 7,010,691 B2 | 3/2006 | Wheeler et al. |
| 7,014,104 B2 | 3/2006 | MacFarlane et al. |
| 7,028,185 B2 | 4/2006 | Wheeler et al. |
| 7,032,112 B2 | 4/2006 | Wheeler et al. |
| 7,039,593 B2 | 5/2006 | Sager |
| 7,047,414 B2 | 5/2006 | Wheeler et al. |
| 7,054,842 B2 | 5/2006 | James et al. |
| 7,058,611 B2 | 6/2006 | Kranzley et al. |
| 7,070,094 B2 | 7/2006 | Stoutenburg et al. |
| 7,082,533 B2 | 7/2006 | Wheeler et al. |
| 7,083,081 B2 | 8/2006 | McGee et al. |
| 7,083,087 B1 | 8/2006 | Gangi |
| 7,086,584 B2 | 8/2006 | Stoutenburg et al. |
| 7,089,421 B2 | 8/2006 | Wheeler et al. |
| 7,092,916 B2 | 8/2006 | Diveley et al. |
| 7,096,205 B2 | 8/2006 | Hansen et al. |
| 7,096,354 B2 | 8/2006 | Wheeler et al. |
| 7,099,035 B2 | 8/2006 | Brooks et al. |
| 7,104,440 B2 | 9/2006 | Hansen |
| 7,107,249 B2 | 9/2006 | Dively et al. |
| 7,117,183 B2 | 10/2006 | Blair et al. |
| 7,158,955 B2 | 1/2007 | Diveley |
| 7,177,848 B2 | 2/2007 | Hogan et al. |
| 7,184,792 B2 | 2/2007 | Mir |
| 7,184,980 B2 | 2/2007 | Allen-Roumann et al. |
| 7,184,989 B2 | 2/2007 | Hansen et al. |
| 7,195,154 B2 | 3/2007 | Routhenstein |
| 7,225,154 B2 | 5/2007 | Hansen |
| 7,228,292 B2 | 6/2007 | Coyle |
| 7,257,228 B2 | 8/2007 | Wheeler et al. |
| 7,264,152 B2 | 9/2007 | Tsuei et al. |
| 7,266,533 B2 | 9/2007 | Karas et al. |
| 7,309,003 B2 | 12/2007 | Algiene et al. |
| 7,316,350 B2 | 1/2008 | Algiene |
| 7,319,977 B2 | 1/2008 | McGee et al. |
| 7,328,191 B2 | 2/2008 | McGee et al. |
| 7,349,885 B2 | 3/2008 | Gangi |
| 7,357,312 B2 | 4/2008 | Gangi |
| 7,379,919 B2 | 5/2008 | Hogan et al. |
| 7,398,225 B2 | 7/2008 | Voltmer et al. |
| 7,398,252 B2 | 7/2008 | Neofytides et al. |
| 7,516,886 B2 | 4/2009 | Gangi |
| 7,708,198 B2 | 5/2010 | Gangi |
| 7,712,658 B2 | 5/2010 | Gangi |
| 7,828,208 B2 * | 11/2010 | Gangi ............... 235/380 |
| 2001/0034720 A1 | 10/2001 | Armes |
| 2001/0047335 A1 | 11/2001 | Arndt et al. |
| 2002/0007306 A1 | 1/2002 | Granger et al. |
| 2002/0007320 A1 | 1/2002 | Hogan et al. |
| 2002/0010623 A1 | 1/2002 | McCollom et al. |
| 2002/0035536 A1 | 3/2002 | Gellman |
| 2002/0062249 A1 | 5/2002 | Iannacci |
| 2002/0083010 A1 | 6/2002 | Kim |
| 2002/0087462 A1 | 7/2002 | Seifert et al. |
| 2002/0111863 A1 | 8/2002 | Landesmann |
| 2002/0112160 A2 | 8/2002 | Wheeler et al. |
| 2002/0120627 A1 | 8/2002 | Mankoff |
| 2002/0128903 A1 | 9/2002 | Kernahan |
| 2002/0152168 A1 | 10/2002 | Neofytides et al. |
| 2002/0153414 A1 | 10/2002 | Stoutenburg et al. |
| 2002/0161702 A1 | 10/2002 | Milberger et al. |
| 2002/0198806 A1 | 12/2002 | Blagg et al. |
| 2003/0021242 A1 | 1/2003 | Drysdale et al. |
| 2003/0028518 A1 | 2/2003 | Mankoff |
| 2003/0051145 A1 | 3/2003 | Jackson et al. |
| 2003/0055780 A1 | 3/2003 | Hansen et al. |
| 2003/0069856 A1 | 4/2003 | Seifert et al. |
| 2003/0130940 A1 | 7/2003 | Hansen et al. |
| 2003/0130948 A1 | 7/2003 | Algiene et al. |
| 2003/0135438 A1 | 7/2003 | Blagg et al. |
| 2003/0135459 A1 | 7/2003 | Abelman et al. |
| 2003/0154164 A1 | 8/2003 | Mascavage, III et al. |
| 2003/0158818 A1 | 8/2003 | George et al. |
| 2003/0171992 A1 | 9/2003 | Blagg et al. |
| 2003/0187712 A1 | 10/2003 | Arthus et al. |
| 2003/0222136 A1 | 12/2003 | Bolle et al. |
| 2003/0229541 A1 | 12/2003 | Randall et al. |
| 2003/0229578 A1 | 12/2003 | Hansen et al. |
| 2004/0006537 A1 | 1/2004 | Zelecoski et al. |
| 2004/0030657 A1 | 2/2004 | Holm-Blagg et al. |
| 2004/0039693 A1 | 2/2004 | Nauman et al. |
| 2004/0039702 A1 | 2/2004 | Blair et al. |
| 2004/0049452 A1 | 3/2004 | Blagg |
| 2004/0054625 A1 | 3/2004 | Kellogg et al. |
| 2004/0064405 A1 | 4/2004 | Weichert |
| 2004/0073511 A1 | 4/2004 | Beaumont et al. |
| 2004/0078327 A1 | 4/2004 | Frazier et al. |
| 2004/0083184 A1 | 4/2004 | Tsuei et al. |
| 2004/0088261 A1 | 5/2004 | Moore et al. |
| 2004/0117299 A1 | 6/2004 | Algiene et al. |
| 2004/0117302 A1 | 6/2004 | Weichert et al. |
| 2004/0138947 A1 | 7/2004 | McGee et al. |
| 2004/0139008 A1 | 7/2004 | Mascavage |
| 2004/0148203 A1 | 7/2004 | Whitaker et al. |
| 2004/0148239 A1 | 7/2004 | Albee et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0159699 A1 | 8/2004 | Nelson et al. |
| 2004/0186773 A1 | 9/2004 | George et al. |
| 2004/0205023 A1 | 10/2004 | Hafer et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0215557 A1 | 10/2004 | Michelsen |
| 2004/0215574 A1 | 10/2004 | Michelsen et al. |
| 2004/0230527 A1 | 11/2004 | Hansen et al. |
| 2004/0260653 A1 | 12/2004 | Tsuei et al. |
| 2005/0005123 A1 | 1/2005 | Wheeler et al. |

| | | |
|---|---|---|
| 2005/0005124 A1 | 1/2005 | Wheeler et al. |
| 2005/0010505 A1 | 1/2005 | Darrell |
| 2005/0015280 A1 | 1/2005 | Gabel et al. |
| 2005/0017067 A1 | 1/2005 | Seifert et al. |
| 2005/0044373 A1 | 2/2005 | Wheeler et al. |
| 2005/0075974 A1 | 4/2005 | Turgeon |
| 2005/0080691 A1 | 4/2005 | Holm-Blagg |
| 2005/0080730 A1 | 4/2005 | Sorrentino |
| 2005/0091116 A1 | 4/2005 | Monk |
| 2005/0091153 A1 | 4/2005 | Monk |
| 2005/0107152 A1 | 5/2005 | McGee et al. |
| 2005/0108130 A1 | 5/2005 | Monk |
| 2005/0114217 A1 | 5/2005 | Monk |
| 2005/0116027 A1 | 6/2005 | Algiene et al. |
| 2005/0119968 A1 | 6/2005 | Michelsen et al. |
| 2005/0119969 A1 | 6/2005 | Michelsen et al. |
| 2005/0137986 A1 | 6/2005 | Kean |
| 2005/0167481 A1 | 8/2005 | Hansen et al. |
| 2005/0177496 A1 | 8/2005 | Blagg et al. |
| 2005/0185774 A1 | 8/2005 | Grear et al. |
| 2005/0185780 A1 | 8/2005 | Grear et al. |
| 2005/0187782 A1 | 8/2005 | Grear et al. |
| 2005/0187830 A1 | 8/2005 | Grear et al. |
| 2005/0187841 A1 | 8/2005 | Grear et al. |
| 2005/0267840 A1 | 12/2005 | Holm-Blagg et al. |
| 2006/0005192 A1 | 1/2006 | Predergast et al. |
| 2006/0016879 A1 | 1/2006 | Kean |
| 2006/0028319 A1 | 2/2006 | Kean et al. |
| 2006/0036496 A1 | 2/2006 | Cowell et al. |
| 2006/0036543 A1 | 2/2006 | Blagg et al. |
| 2006/0059040 A1 | 3/2006 | Eldred et al. |
| 2009/0108056 A1 | 4/2009 | Faust |
| 2010/0219242 A1 | 9/2010 | Gangi |

FOREIGN PATENT DOCUMENTS

| | | | |
|---|---|---|---|
| DE | 100 50 882 A1 | | 5/2002 |
| EP | 0661675 A2 | | 5/1995 |
| EP | 0656600 A2 | | 6/1995 |
| EP | 0722241 A2 | | 12/1996 |
| EP | 1017030 A2 | | 7/2000 |
| EP | 1028401 A2 | | 8/2000 |
| JP | 55143679 A | | 11/1980 |
| JP | 61253580 | | 11/1986 |
| JP | 02148374 | | 6/1990 |
| JP | 05040864 | | 2/1993 |
| JP | 2004102784 | | 4/2004 |
| WO | 92/16913 A1 | | 10/1992 |
| WO | 98/10363 | | 3/1998 |
| WO | 98/12675 | | 3/1998 |
| WO | 99/05633 A1 | | 2/1999 |
| WO | 99/38129 A1 | | 7/1999 |
| WO | 99/49424 A1 | | 9/1999 |
| WO | 99/57675 A1 | | 11/1999 |
| WO | 00/25262 A1 | | 5/2000 |
| WO | 00/30048 A1 | | 5/2000 |
| WO | 00/33497 A2 | | 6/2000 |
| WO | 00/49586 A1 | | 8/2000 |
| WO | 00/52900 A1 | | 9/2000 |
| WO | 00/54208 A2 | | 9/2000 |
| WO | 01/29789 A1 | | 4/2001 |
| WO | 0129789 A1 | | 4/2001 |
| WO | 01/46902 A1 | | 6/2001 |
| WO | 01/50429 A | | 7/2001 |
| WO | 01/54082 A2 | | 7/2001 |
| WO | 01/61920 A1 | | 8/2001 |
| WO | 01/69556 A2 | | 9/2001 |
| WO | 01/71675 A1 | | 9/2001 |
| WO | 01/78024 A2 | | 10/2001 |
| WO | 01/88659 A1 | | 11/2001 |
| WO | 2005/052871 A1 | | 6/2005 |

OTHER PUBLICATIONS

"American Express India expands Membership Rewards program", M2 Presswire, Mar. 2000, http://findarticles.com/p/articles/mi_hb5243/is_200003/ai_n20070910/, 1 page.

"Continental Airlines: Continental Airlines in introduces interactive customer loyalty program", M2 Presswire, Dec. 1999, 1 page.

"AmEx Rewards Beefed-Up", Oct. 14, 1999, CardTrak Online, http://www.cardweb.com/cardtrak/news/1999/october/4a.html, 2 pages.

"Midway Airlines joins American Express membership rewards programme", Airlien Industry Information, Mar. 3, 2000, http://www.allbusiness.com/operations/shipping-aair-freight/448154-1.html, 3 pages.

Rowley, Jennifer, "Loyalty Kiosks: making loyalty cards work", British Food Journal, 2000, vol. 102, Issue 5/6, p. 390-398.

McDonald, Courtney, "Kroger now offering fingerprint scanning", Jun. 10, 2002, 3 pages.

"Supermarket Chain Kroger Plans Discount Card for Houston-Area Customers", Houston, Chronicle, May 5, 2000, 1 page.

"Kroger Supermarkets in Fort Worth, Texas, Area to Offer Customer Loyalty Card", Fort Worth Star-Telegram, Jul. 21, 2000, 2 pages.

Office Action for U.S. Appl. No. 11/932,049, 12 pages.

Office Action for U.S. Appl. No. 11/929,592, dated May 19, 2008, 5 pages.

Office Action for U.S. Appl. No. 11/929,592, dated Jun. 30, 2008, 23 pages.

Response to Restriction Requirement with Extension of Time from co-pending U.S. Appl. No. 11/929,592, submitted on May 23, 2008 (9 pages).

Terminal Disclaimer and Statement Under 37 CFR 2.73(b) and Response to Office Action, from co-pending U.S. Appl. No. 11/929,592, submitted on Sep. 30, 2008 (32 pages).

Supplemental Amendment, Exhibit A (Substitute Specification), Exhibit B (Substitute Specification: Track Changes Copy), from co-pending U.S. Appl. No. 11/929,592, submitted on Dec. 4, 2008 (89 pages).

Notice of Allowance, from co-pending U.S. Appl. No. 11/929,592, dated Jan. 22, 2009 (34 pages).

Comments on Statement of Reasons for Allowance and Part B-Fee(s) Transmittal, from co-pending U.S. Appl. No. 11/929,592, submitted Jan. 23, 2009 (2 pages).

R. Zapata, article, titled Visa Hit with Suit Over No-Contact Credit Cards, Portfolio Media, Oct. 4, 2007.

EMV '96 Integrated Circuit Card Application Specification for Payment Systems, Version 3.1.1 (May 31, 1998).

ISO/IEC JTC 1/SC 27 Information Technology—Security Techniques (May 10, 1999).

File History of Gangi, U.S. Patent 6,938,821, (U.S. Appl. No. 10/052,405) including arguments from the Examiner and arguments in support of patentability.

File History of Gangi, U.S. Patent 7,083,087 (U.S. Appl. No. 11/130,765), including arguments from the Examiner and arguments in support of patentability.

File History of Gangi, U.S. Appl. No. 11/929,592.

Partial File History of Gangi U.S. Appl. No. 10/235,012, abandoned.

Partial File History of Gangi, U.S. Patent 6,131,811 (U.S. Appl. No. 09/087,193), including arguments from the Examiner and arguments in support of patentability.

Partial File History of Gangi U.S. Patent 6,293,462 (U.S. Appl. No. 09/818,407), including arguments from the Examiner and arguments in support of patentability.

Partial File History of Gangi U.S. Patent 6,402,029 (U.S. Appl. No. 09/664,205), including arguments from the Examiner and arguments in support of patentability.

File History of Gangi U.S. Appl. No. 11/923,049.

File History of Gangi U.S.Appl. No. 11/931,479.

File History of Gangi U.S. Appl. No. 09/923,617, including arguments from the Examiner and arguments in support of patentability, part 1.

File History of Gangi U.S. Appl. No. 09/923,617, including arguments form the Examiner and arguments in support of patentability, part 2.

Towiko Electronics, "Products Overview Smartcard Terminals & Systems," Feb. 1998.

K Vedder, et al., Smart Cards—Requirements, Properties and Applications, 1998.

ActivCard, ActivCard, Inc., 1998.

OKI Advanced Products, OKI America, Inc., "Value-Checker.TM. CP," 1998.

Logis Chipcard Products,"Logismart Chipcard Readers—Worth Your Attention," 1998.

Setec Oy, "Setpurse.TM.," 1998.
NURI Information & Communication Inc., "NURI Smart Card Solutions," 1998.
Visa U.S.S., "VisaSmart".
ViVOwallet, found at www.vivotech.com.
Lindenmayer, Article, American Banker, titled First Data, Grocer Tie ACH Payments to Loyalty Cards, Feb. 8, 2006.
Abstract for Japanese Patent Publication No. 2004-102784, Patent Abstracts of Japan (2 pages).
Abstract for Japanese Patent Publication No. 61-253580, Patent Abstracts of Japan (1 page).
Abstract for German Patent Publication No. 10050882,esp@cenet(1 page).
Abstract for Japanese Patent Publication No. 55-143679, Patent Abstracts of Japan (2 pages).
Abstract for Japanese Patent Publication No. 02-148374, Patent Abstracts of Japan (2 pages).
Abstract for Japanese Patent Publication No. 05-040864, Patent Abstracts of Japan (2 pages).
Abstract for WO0030048, esp@cenet (1 page).
Abstract for WO0171675, esp@cenet ( page).
Office Action for U.S. Appl. No. 11/932,049, dated Apr. 30, 2009, 12 pages.
Office Action for U.S. Appl. No. 11/931,479 dated Apr. 15, 2009.

* cited by examiner

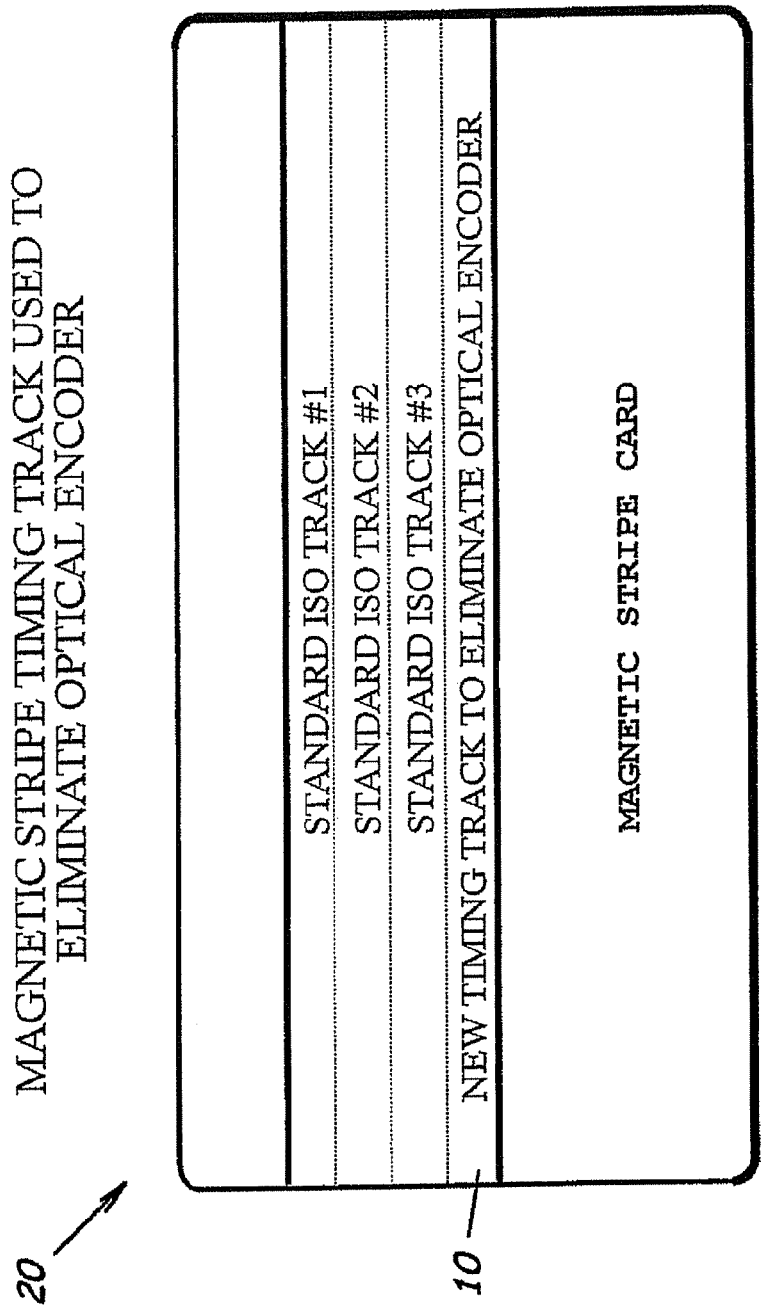

FIG. 2.

| | RECORDING DENSITY (bits per inch) | CHARACTER CONFIGURATION (including parity bit) | INFORMATION CONTENT (including control characters) |
|---|---|---|---|
| TRACK 1 IATA | 210 BPI | 7 BITS PER CHARACTER | 79 ALPHANUMERIC CHARACTERS |
| TRACK 2 ABA | 75 BPI | 5 BITS PER CHARACTER | 40 NUMERIC CHARACTERS |
| TRACK 3 THRIFT | 210 BPI | 5 BITS PER CHARACTER | 107 NUMERIC CHARACTERS |

——— 76 ALPHA NUMERIC DATA CHARACTERS ———

| SS | FC | PAN | FS | NAME | FS | ADDITIONAL DATA | | DISCRETIONARY DATA | | ES | LRC |
|---|---|---|---|---|---|---|---|---|---|---|---|
| | | Primary Account No. (19 digits Max) | | Name (26 alphanumeric characters Max) | | | NO. OF CHARACTERS | | NO. OF CHARACTERS | | |
| | | | | | | Expiration Date (YYMM) | 4 | PVK1 | 1 | | |
| | | | | | | Service Code | 3 | PW OR Offset | 4 | | |
| | | | | | | | | CW or CVC | 3 | | |
| | | | | | | | | Some or all of the above fields may be found within the Discretionary data. | | | |

| SS | FC | PAN | FS | ADDITIONAL DATA | | DISCRETIONARY DATA | | ES | LRC |
|---|---|---|---|---|---|---|---|---|---|
| | | Primary Account No. (19 digits Max) | | | NO. OF CHARACTERS | | NO. OF CHARACTERS | | |
| | | | | Expiration Date (YYMM) | 4 | PVK1 | 1 | | |
| | | | | Service Code | 3 | PW OR Offset | 4 | | |
| | | | | | | CW or CVC | 3 | | |
| | | | | | | Some or all of the above fields may be found within the Discretionary data. | | | |

←——————— 37 ALPHA NUMERIC DATA CHARACTERS ———————→

*FIG. 4.*

104 ALPHA NUMERIC DATA CHARACTERS

| SS | FC | PAN | FS | USE AND SECURITY DATA | ADDITIONAL DATA | ES | LRC |
|---|---|---|---|---|---|---|---|
| | | Primary Account No. (19 digits Max) | | (see below) | (see below) | | |

USE AND SECURITY DATA

| | NO. OF CHARACTERS |
|---|---|
| Country Code (opt.) | 3 |
| Currency Code | 3 |
| Currency Exponent | 1 |
| Amount Authorized per Cycle | 4 |
| Amount Remaining this Cycle | 4 |
| Cycle Begin (Validity Date) | 4 |
| Cycle Length | 2 |
| Retry Count | 1 |
| PIN Control Parameters | 6 |
| Interchange Control | 1 |
| PAN Service Restriction | 2 |
| SAN-1 Service Restriction | 2 |
| SAN-2 Service Restriction | 2 |
| Expiration Date (opt.) | 4 |
| Card Sequence Number | 1 |
| Card Security Number (opt.) | 9 |

ADDITIONAL DATA

| | NO. OF CHARACTERS |
|---|---|
| First Subsidiary Account Number (opt.) | |
| Secondary Subsidiary Account Number (opt.) | |
| Relay Marker | 1 |
| Cryptographic Check Digits (opt.) | 6 |
| Discretionary Data | |

FIG. 5.

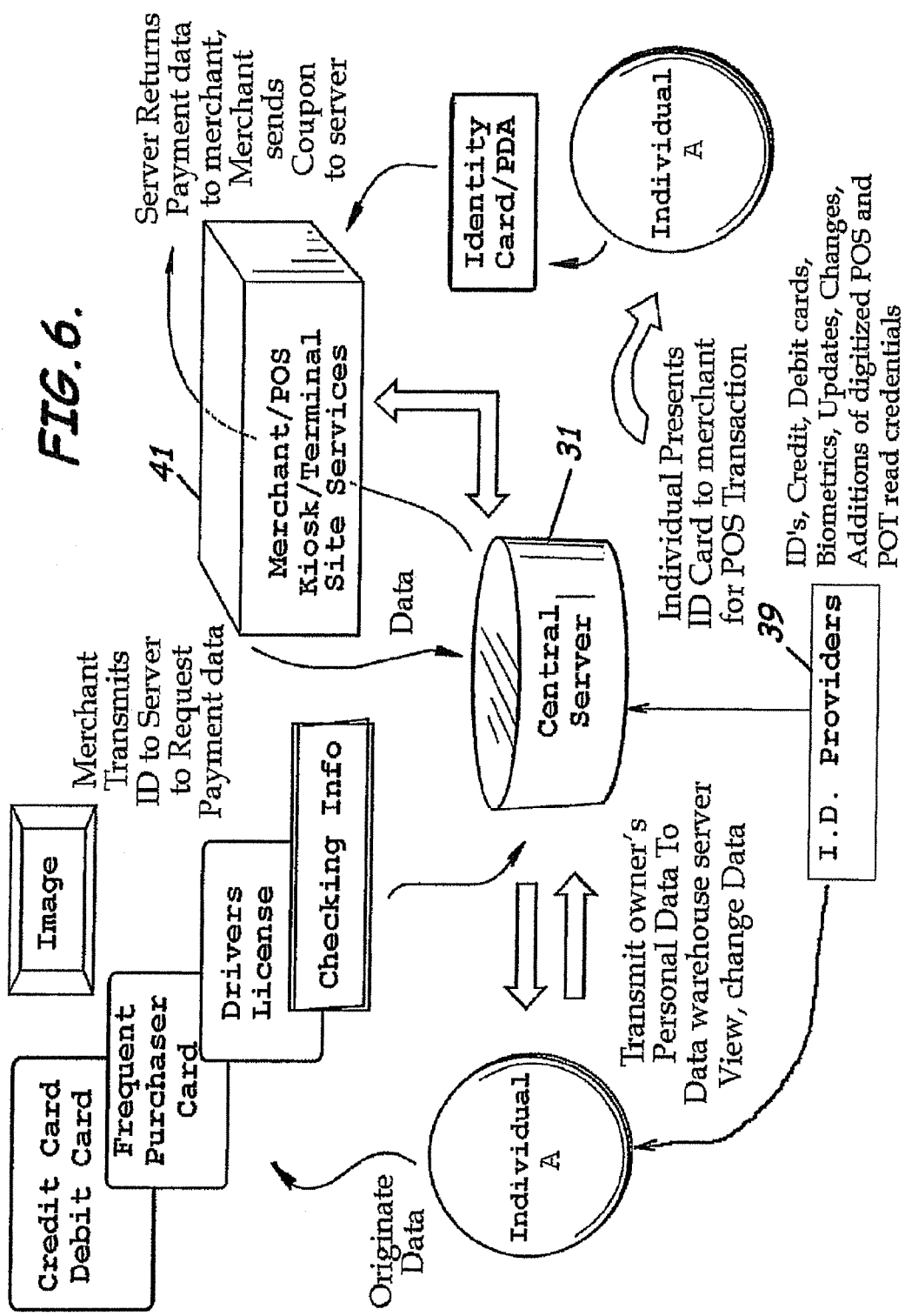

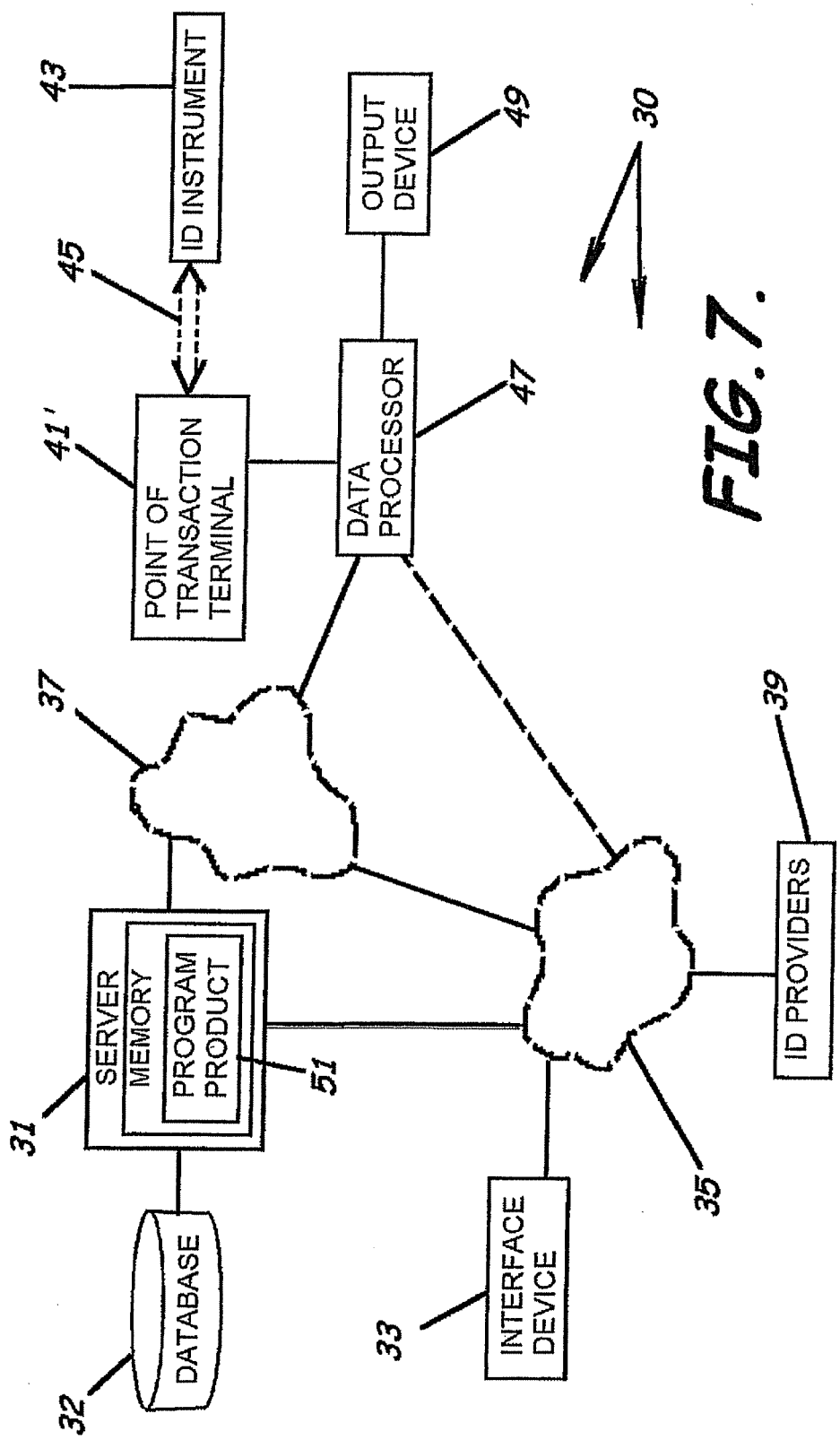

RETAIL POINT-OF-TRANSACTION SYSTEM, PROGRAM PRODUCTS, AND RELATED METHODS TO PROVIDE A CUSTOMIZED SET OF IDENTIFICATION DATA TO FACILITATE A TRANSACTION USING ELECTRONIC COUPONS

RELATED APPLICATIONS

This application is a continuation of and claims priority to and the benefit of U.S. patent application Ser. No. 12/359,927, filed on Jan. 26, 2009, now U.S. Pat. No. 7,828,208, which is a continuation of U.S. patent application Ser. No. 11/929,592, filed on Oct. 30, 2007, now U.S. Pat. No. 7,516,886, which is a continuation of U.S. patent application Ser. No. 11/394,314, filed on Mar. 30, 2006, now U.S. Pat. No. 7,357,312, which is a continuation-in-part of U.S. patent application Ser. No. 11/130,765, filed on May 17, 2005, now U.S. Pat. No. 7,083,087, which is a continuation of U.S. patent application Ser. No. 10/052,405, filed Jan. 17, 2002, now U.S. Pat. No. 6,938,821, which is a continuation-in-part of U.S. patent application Ser. No. 09/664,205, filed on Sep. 18, 2000, now U.S. Pat. No. 6,402,029, which is a continuation-in-part of U.S. patent application Ser. No. 09/618,407, filed on Jul. 18, 2000, now U.S. Pat. No. 6,293,462, which is a continuation of U.S. application Ser. No. 09/087,193, filed on May 29, 1998, now U.S. Pat. No. 6,131,811 all incorporated herein by reference in their entirety.

BACKGROUND OF THE INVENTION

1. Field of the Invention

The present invention relates generally to an improvement for the use of magnetic striping on devices such as credit cards and the like, and in particular, but not by way of any limitation, to a methodology and improved magnetic stripe card which is capable of encoding additional information other than that originally presented on the card, particularly identification and personal data.

2. Description of the Related Art

In today's electronic commerce there has been a proliferation in the use of various types of credit, debit, identification, and other types of authorization cards. For example, an average individual is likely to carry a driver's license, several credit and/or debit cards, an identification card for access to a health club, an identification card to gain access to a place of employment and an access card to gain entry into a parking garage, among others. Furthermore, with advances in electronic commerce, smart cards are likely to replace paper and coin money resulting in an additional card for consumers to carry. Each of these cards typically incorporate a magnetic stripe or bar code to facilitate easy recognition of the card and to store various types of data. Although the use of these cards allow for easy and efficient electronic commerce, the number of such cards quickly becomes cumbersome and many individuals find carrying the large number of cards inconvenient.

Prior art magnetic stripe credit cards, and the like, have various limitations. For example, virtually all the prerecorded magnetic stripe cards that are currently in use are used for a single purpose. For example, a credit card or an identity card is generally used for just that purpose alone. In many instances, owners and users of these type of cards need to present several cards in order to maximize or complete a given transaction. Specifically, a discount card, such as is used in certain supermarkets, as well as the credit card to make the purchase, must be both presented so as to obtain the discount.

Various solutions such as providing a sticker which can be placed on a credit card or the like have been suggested, however, these defeat the purpose of having an increased level of automation for check outs, for example.

There are many instances whereby an individual, consumer, entity, organization, etc., would find it desirable to provide others with a secure, customized set of identification data that would facilitate a transaction, facilitate an event of a specific type, or both. Additionally, the receiver of the data for the transaction may wish to provide complimenting and supplemental data back to the originator of the transaction with all such transactions being done in a digitized format to be interpreted, manipulated, and/or displayed on point-of-sale transaction (POS) devices/computers both at the POS and remotely. Additionally, the process of initializing this secure transaction would be more flexible if the acceptors of the transaction could utilize a magnetic stripe card that could combine a unique identifying code with the standard ISO data from other completely different financial or other card's magnetically striped data.

SUMMARY OF THE INVENTION

In view of the foregoing, embodiments of the present invention provide a solution, which is both cost efficient and time efficient, and which allows the use of conventional types of magnetic stripe readers which are currently being used in most retail establishments, One embodiment of the present invention allows for a single swipe of the card through the magnetic stripe reader to provide all the identification information in one pass. This can be accomplished by recording onto the conventional magnetic stripe of the credit card, the desired data from multiple cards and other sources which are necessary to complete a chosen transaction. In particular, a secure, customized set of identification data may be used to facilitate a transaction, facilitate an event of a specific type, or both, Embodiments of the present invention employ a system and method for providing a customized set of identification data to facilitate a transaction, and apparatus for providing additional information onto the magnetic stripe of a card, and for consolidating multiple information from multiple cards as well as other sources onto the magnetic stripe card. In order to do so, for example, a wallet consolidator, such as that shown in U.S. Pat. No. 6,131,811 by Gangi titled "Wallet Consolidator," can be employed. Although other types of readers and writers could be used to generate this data, this invention should in no way be considered to be limited to the use of any specific wallet consolidator or other means such as is mentioned above. Specifically, a device such as, for example, a wallet consolidator, can be used in which the magnetic stripe information from multiple credit cards can be read from what is generally the commonly used three IS 0/8711 tracks that are present on the card. However, it should be noted that in many types of credit cards one or more of these tracks may have no data provided on the card, What can then be accomplished is the reading of multiple tracks from multiple cards, storing this all in memory, and then rewriting the information to either a blank card or to the existing card after erasing the information along with, if necessary, writing additional "foreign" data onto the card. In another embodiment it may be possible to write the additional foreign data on an existing card without an erasure and re-writing of the data; however, this is not the preferred mode of operation.

According to an embodiment of the present invention, a secure, customized set of personal identification data can be placed at the end of any data, which was originally on the track or on an empty track. It may also be placed at any other position that the reading software in a point-of-sale (POS) or other point-of-transaction (POT) type terminal would have or would find to be ideal. This could also be at the front of a track, for example, or embedded within the track. The data of each track is formatted with a start sentinel character, followed by the data itself, followed by a stop sentinel. This data is then used to facilitate a transaction, facilitate an event of a specific type, or both. Conventional magnetic swipe readers look for the start or stop sentinel to indicate that a body of data follows. It should be noted, however, that some readers will read the data irrespective of which way the card is swiped through the reader. The electronic circuitry in these types of readers detect the direction of the swipe by noting whether a start or stop sentinel is received first. This means that foreign data placed after the stop sentinel will not be recognized if it is not bracketed by standard start and stop sentinels.

The ISO-8711 standard specifies at least two machine control codes for each type of track. Specifically, the types of tracks can be, for example, 75 or 210 bpi. These control codes can be used to bracket the foreign data. It would then be possible to design a reader that will look for data bracketed by the special control codes and/or design software that will look for the data bracketed by these special control codes after a standard stop sentinel. Foreign data, such as coupon information, a discount card number, or the like, may be written in any track that was originally unused, or even if used, may be written after a stop sentinel, and if that foreign data is bracketed by these special control codes, the foreign data will not be read by standard magnetic swipe readers, and therefore, will be ignored. However, special readers in the software at the host computer for the transaction can look for these special control codes and then confine the foreign data and organize it in a manner acceptable for multiple purposes in the individual cards. This makes it possible to have additional information placed on the magnetic stripe card, which would not be read by conventional readers in the field, but would be obtainable from specialized readers, Embodiments of the present invention can include a retail point-of-sale system to provide a customized set of identification data to facilitate a retail sales point-of-sale transaction. The retail point-of-sale system, for example, can include a plurality of retail sales point-of-sale terminals, one or more retail system computers, a database accessible by the one or more retail system computers, and a program product stored in the memory of the one or more retail system computers. The plurality of retail sales point-of-sale terminals can be positioned, for instance, at one or more retail locations. According to an embodiment of the present invention, each of the plurality of retail sales point-of-sale terminals can be positioned to accept purchase transactions from purchasers of goods by interaction with one or more retail sales point-of-sale terminals. Each of the plurality of retail sales point-of-sale terminals, can for example, have a display associated with the retail sales point-of-sale terminal to at least visually display data to one or more of a plurality of users. The one or more retail system computers, for instance, can each have a memory. Also according to an embodiment of the present invention, the one or more retail system computers can be positioned, for example, to provide data to and from each of the plurality of remotely positioned retail sales point-of-sale terminals and at least one remotely positioned computer associated with a provider of components of data profiles to thereby facilitate one or more point-of-sale transactions through each of the plurality of remotely positioned retail sales point-of-sale terminals.

The database accessible by the one or more retail computers, according to an embodiment of the present invention, can have stored therein a plurality of personal control IDs where each personal control ID is associated with a different one of a plurality of remotely positioned users and a plurality of sets of personal data. Each set of personal data, for example, can include components of data profiles provided by providers of components of data profiles and can be associated with a corresponding different one or more of the plurality of remotely positioned users. According to an embodiment of the present invention, one or more data profiles can be derived from, and can be defined by, at least a portion of each of the plurality of sets of personal data and can be associated with a respective one of the plurality of personal control IDs and one or more provider IDs. The one or more data profiles, can for example, be stored in the database so that the one of the plurality of remotely positioned users associated with the respective one of the plurality of personal control IDs can selectively predetermine the contents of the data profile.

According to an embodiment of the present invention, the computer program product stored in the memory of the one or more retail system computers can include, for example, instructions that when executed by the one or more retail system computers cause the one or more retail system computers to perform the operations of: receiving a request for at least one of the plurality of data profiles associated with one of the plurality of remotely positioned users from at least one of the plurality of retail sales point-of-sale terminals remote from and positioned to provide data to and from the one or more retail system computers; providing a customized set of identification data responsive to the request and based on a data profile to facilitate one or more retail point-of-sale transactions through one or more of the plurality of retail sales point-of-sale transaction terminals; and verifying at least a portion of the customized set of identification data received responsive to a personal control ID of the one of the plurality of remotely positioned users being entered through one of the plurality of retail point-of-sale transaction terminals prior to completing the one or more retail point-of-sale transactions. The request for at least one of the plurality of data profiles, for example, can include both a personal control ID of the respective user and one of one or more provider IDs where each of the one or more provider IDs is associated with one of, or both, a retail merchant or retail service provider or at least one provider of components of data profiles.

Embodiments in the present invention can also include a system which can provide a customized set of identification data to facilitate a transaction. For example, according to an embodiment of the present invention, a system can include a server configured to store a plurality of sets of personal data and a plurality of personal control IDs associated with a respective different person and a respective set of personal data entered into the server and controlled by the respective different person via the Internet or via a point-of-transaction and configured to store a data profile derived from the set of personal data associated with the personal control ID identifying a selected different person and assembled together by the selected different person for use by a selected one of one or more providers identified by a respective provider ID. The system can also include a data processor remote from and in communication with the server, and a terminal positioned at a point-of-sale or other point-of-transaction and in communication with the data processor. The data processor can be configured to transmit or otherwise send to the server the personal control ID identifying the selected different person and the provider ID identifying the selected provider. The terminal is adapted to couple to an ID instrument via a data communication link to receive from the ID instrument the personal control ID identifying the selected different person, and to send the personal control ID identifying the selected different person to the data processor. The server can be correspondingly further configured to retrieve from the plurality of sets of personal data, the data profile derived from the set of personal data associated with the personal control ID identifying the selected different person; and can be configured to transmit or otherwise send to the data processor the data profile for use by the selected provider identified by the provider ID. An output device can be connected to the data processor and/or terminal to receive from or through the data processor the data profile received from the server and to output the data profile to the selected provider to thereby verify the personal control ID as being associated with a user of the personal control ID at the point-of-sale or other point-of-transaction prior to proceeding with a transaction.

According to another embodiment of the present invention, the system can include a point-of-transaction (POT) terminal adapted to couple to an ID instrument via a data communication link to receive from the ID instrument a personal control ID identifying a selected different person and to send the personal control ID identifying the selected different person. The system can include a server configured to store a plurality of personal control IDs and a plurality of sets of personal data entered into the server and controlled by each respective different person via the Internet or via a point-of-transaction, and configured to store a data profile derived from a set of personal data associated with the personal control ID identifying the selected different person and assembled together by the selected different person for use by a selected one of one or more providers identified by a provider ID. The server also can be configured to retrieve from the plurality of sets of personal data the data profile derived from the set of personal data associated with the personal control ID identifying the selected different person, and configured to send the data profile for use by the selected provider identified by the provider ID. The system can also include an output device. The output device can be configured to receive at least a portion of the data profile sent from the server and configured to output the data profile to the selected provider to thereby verify the personal control ID as being associated with a user of the personal control ID at the point-of-transaction prior to proceeding with a transaction.

According to another embodiment of the present invention, the system can include a computer having memory, a database in communication with the computer to store a plurality of personal control IDs and a plurality of sets of personal data, and program product stored in the memory of the computer. The program product can include instructions to perform the operations of receiving a set of personal data from a remotely positioned user, requesting and receiving a personal control ID from the user to associate with a set of personal data, storing the personal control ID and the set of personal data in the database, receiving from a point-of-transaction terminal or associated data processor a request for at least a portion of the set of personal data of the user, and providing a customized set of identification data based on a data profile derived from the set of personal data of the user for use by the provider identified by the provider ID.

Embodiments of the present invention also include methods for providing a customized set of identification data to facilitate a transaction. For example, a method for providing a customized set of identification data to facilitate a transaction can include receiving a set of personal data from the user, receiving a personal control ID from a user to associate with the set of personal data, storing the personal control ID and the set of personal data in a database, and loading an ID instrument with the personal control ID and transaction data. The method can also include acquiring a personal control ID of the user from the ID instrument, for example, at a point-of-sale or other point-of-transaction, and submitting a request for at least a portion of a set of personal data of the user, along with both the personal control ID of the user and a provider ID of a provider, to a remote computer in communication with the database, and deriving a data profile from the set of personal data of the user for use by the provider identified by the provider ID responsive to the personal control ID and the provider ID. The method can also include providing a customized set of identification data, based on the data profile, for use by the provider identified by the provider ID, for example, to identify the user. The method can further include generating incentives to the user for making future purchases responsive to receipt of the set of personal data related to the personal control ID. The incentives can include, for example, a coupon or a discount offer. Changes, updates, and additions to the data profile can also be received from providers of components of data profiles and processed accordingly.

According to another embodiment of a method for providing a customized set of identification data to facilitate a transaction, the method can include acquiring a personal control ID of a user from an ID instrument, and submitting a request to a computer for at least a portion of a set of personal data of the user along with both the personal control ID of the user and a provider ID of a provider. The personal control ID is associated with the set of personal data of the user, and the provider ID is associated with the provider. The method also includes providing a customized set of identification data for use by the provider identified by the provider ID to identify the user, the customized set of identification data based on a data profile derived from the set of personal data of the user.

According to another embodiment of a method for providing a customized set of identification data to facilitate a transaction, the method can include receiving a set of personal data of a user defining user credentials to add the user to a user network, associating a personal control ID with the user credentials, and deriving a data profile from the user credentials for use by a provider to thereby provide a customized set of identification data to the provider. The method can also include acquiring the personal control ID of the user from an ID instrument, identifying the personal control ID as that of the user responsive to the personal control ID to thereby confirm that the user is a member of the user network, and providing a customized set of identification data to a transaction site operator associated with the provider responsive to the identification. The customized set of identification data can be based on the data profile associated with the provider. The method can further include authorizing completion of a transaction by the transaction site operator associated with the provider responsive to the customized set of identification data. Advantageously, the customized set of identification data can include user identification information, e.g., driver's license, scanned personal image, etc., provided to allow visual authentication of the user by the transaction site operator. Accordingly, the step of authorizing completion of a transaction can include the steps of confirming by the transaction site operator that the user is the user associated with the personal control ID, and manipulating a peripheral device associated with the point of transaction, responsive to the provided user identification information and the customized set of identification data, According to an embodiment of the method for providing a customized set of identification data to facilitate a transaction, the method can include providing credentials to a first user by an ID provider, storing the credentials in the memory of a first ID instrument, and forwarding the credentials to a second ID instrument in the possession of a second user to thereby allow for receipt of data otherwise stored on the first ID instrument to enable transaction data accessible to the first ID instrument for use by the second user. The forwarding can be directly between ID instruments or indirectly over a communication network such as, for example, through a central server.

Embodiments of the present invention can also include a computer readable medium that is readable by a computer providing a customized set of identification data to-facilitate a transaction. For example, a computer readable medium can include a set of instructions that, when executed by the computer, cause the computer to perform the operations of receiving a set of personal data from a remotely positioned user, receiving a personal control ID from the user to associate with the set of personal data, associating and storing the personal control ID and the set of personal data in a database in communication with the computer, and sending the personal control ID and/or personal data via the Internet or a point-of-transaction to load on an ID instrument. The instructions can also include those to perform the operation of deriving a data profile from the set of personal data of the user responsive to the personal control ID and a provider ID. The instructions can also include those to perform the operation of receiving a request for at least a portion of the set of personal data of the user along with both the personal control ID of the user and the provider ID of a provider from a requester, e.g., point-of-sale terminal or a point-of-transaction terminal, or a data processor in communication with the computer and the point-of-sale terminal or other point-of-transaction terminal. The instructions can further include those to perform the operation of providing the requester customized data responsive to receiving the personal control ID of the user and the provider ID of the provider and/or the data profile, for use by the provider, for example, in identifying the user, verifying the identity of the user, and/or supplementing additional personal data information beyond that stored on an ID instrument.

According to another embodiment of the present invention, the computer readable medium can include a set of instructions that, when executed by the computer, cause the computer to perform the operations of receiving a set of personal data of a user defining user credentials to add the user to a user network, associating a personal control ID with the user credentials, deriving a data profile from the user credentials for use by a provider to thereby provide a customized set of identification data to the provider, receiving the personal control ID of the user from an ID instrument, identifying the user as a member of the user network responsive to the personal control ID, and providing the customized set of identification data to the provider. Advantageously, the operation of deriving the data profile from the user credentials can include associating user credentials from a plurality of ID providers with user credentials provided by a single provider. Additionally, the customized set of identification data can include indicia that the user presenting the ID instrument is a member of the user network. Such indicia can be readily used by a provider's point-of-transaction terminal (machine or operator) as a flag to determine if the user is authorized access to the peripheral device associated with the point-of-transaction terminal.

According to another embodiment of the present invention, a computer readable medium that is readable by at least one processor, e.g., associated with a server, ID provider, and/or one or more ID instrument processors, can include a set of instructions that, when executed by the at least one processor, cause the at least one processor to perform the operations of providing credentials to a first user by an ID provider and storing the credentials in the memory of a first ID instrument to thereby facilitate a transaction at a point-of-sale or other point-of-transaction. Additionally, the instructions can include those to perform the operation of forwarding the credentials to a second ID instrument in the possession of a second user either directly from the first user or from a central computer to thereby allow for receipt of data otherwise stored on, or accessible to, the first ID instrument. Such credentials can advantageously allow the second user, e.g., a family member, to have, for example, access to financial instruments owned by the first user such as, e.g., a credit card, debit card, or bank account.

Embodiments of the present invention can allow one personal control ID or set of access credentials to access other secure personal data including other credentials associated with one or more providers of such IDs/credentials. For example, a loyalty card issued by a retail sales provider can be used to access a major credit card provided by a credit card provider. A list of devices by provider/location and the date and time to be activated/deactivated can be maintained and linked with a personal control ID or set of credentials to allow access thereto. Examples of such devices can include a door, turnstile, gate to a secure location for events, visitor or member admittance, and security doors. Other such devices can include automatic teller machines or other self-service devices that require identification. Such activation can be authorized by use of ID instruments that incorporate a readable storage medium such as, for example, those employing RFID, RF, magnetic stripe, bar-code, optical, audio, and/or IR technology in concert with enabled devices such as, for example, a cell phone or PDA. For example, through use of the system and methods disclosed herein, a driver's license having a magnetic strip or RFID tag can be used to activate an on-site peripheral device such as, for example, a gasoline pump lock or security gate. Advantageously, this process can be utilized via any of the previously registered profile attributes, cards, and/or data registered by the owner of the profile (credentials).

Advantageously, embodiments of the present invention allow for sharing of a personal control ID or set of credentials by the owner of the credentials with another user to allow access by the other user to such credentials. For example, a parent can provide a child the parent's personal control ID to allow the child to access the parent's credit or debit card account, negating any need to actually send currency to the child, such as during an emergency, or allow the child access to a "members only" facility such as the parent's recreation or fitness center. Embodiments of the present invention also provide for logging recognition events to thereby track the presentation/usage of identification data geographically and with a timestamp, Embodiments of the present invention also allow for the creation and/or assignment of multiple personal control IDs to be associated with each set of personal data of a different user. Embodiments of the present invention also provide for using a combination of the subscriber identity module (SIM) ID number of the ID instrument, registered electronic signature of the various electrical components of the ID instrument, or other digitized firmware or data unique to the specific ID instrument as access identification to the set of personal data of the respective different user.

Exemplary embodiments of the present invention can include, for instance, a retail point-of-transaction system to provide a customized set of identification data to facilitate a retail transaction. Such a retail transaction, for instance, can include the use of one or more electronic coupons. Accordingly, a retail point-of-transaction system according to an embodiment of the present invention can include a computer having memory and configured to interface with a plurality of remotely positioned users and at least one remotely positioned provider of components of data profiles to facilitate one or more transactions through a retail point-of-transaction terminal positioned remote from the computer. Each of the one or more transactions facilitated by such an exemplary system can include, for instance, the use of one or more electronic coupons. The exemplary retail point-of-transaction system can additionally include a database accessible by the computer to store a plurality of personal control IDs and a plurality of sets of personal data-each set of personal data associated with a corresponding different one or more of the plurality of remotely positioned users and including coupon data. Moreover, such an exemplary retail point-of-transaction system can further include a set of instructions stored in the memory of the computer than when executed causes the computer to perform one or more operations.

The one or more operations can include, according to an exemplary embodiment of the present invention, the operations of receiving a set of personal data from each of the plurality of remotely positioned users, receiving a personal control ID from each of the plurality of remotely positioned users. to associate with the respective set of personal data and an ID instrument associated with the at least one of the plurality of users, and storing the personal control ID and the respective set of personal data of each of the plurality of remotely positioned users in the database. The set of personal data can include, by way of example, coupon data associated with the one or more electronic coupons adapted to be redeemable by at least one of the plurality of users at a point-of-transaction.

Additionally, the set of instructions, when executed by the computer, can further cause the computer to perform the operations of receiving a request, responsive to when the retail point-of-transaction terminal is coupled via a first data communication link to the ID instrument associated with the at least one of the plurality of users, for at least a portion of the set of personal data of the at least one of the plurality of remotely positioned users from the retail point-of-transaction terminal positioned remote from and adapted to be in communication with the computer, and providing a customized set of identification data responsive to a data profile derived from the set of personal data of the at least one of the plurality of remotely positioned users to facilitate one or more retail transactions, which includes the use of one or more electronic coupons, through the retail point-of-transaction terminal. Such a request for at least a portion of the set of personal data of the at least one of the plurality of remotely positioned users can include, for example, both the personal control ID of the respective user and a provider ID. A provider ID, for instance, can be associated with one of, or both, a merchant or service provider or at least one provider of components of data profiles.

The set of instructions, according to an exemplary embodiment of the present invention, can also, when executed by the computer, cause the computer to perform the operations of receiving, via a data communications link, such as, for example, the Internet, one or more coupons to be redeemed by the at least one of the plurality of users at the retail point-of-transaction terminal, and redeeming, responsive to the customized set of identification data and the coupon data associated therewith, the one or more electronic coupons for the one or more retail transactions. Moreover, according to exemplary embodiments of the present invention, at least a portion of the coupon data can be beneficially associated with the at least one provider of components of data profiles. Accordingly, the set of instructions, when executed by the computer, can further cause the computer, for example, to perform the operations of receiving user credentials from a provider of at least one component of the data profile, receiving coupon data from one or more providers of components of data profiles, associating the user credentials and the coupon data with a provider ID and the personal control ID, and processing changes, updates, and additions to the user credentials and the coupon data to thereby define revised user credentials and revised coupon data in digitized either point-of-sale or point-of-transaction ready form.

Exemplary embodiments of the present invention can also include, by way of example, a computer implemented method to provide a customized set of identification data to thereby facilitate a retail transaction at a retail point-of-transaction terminal. Such an exemplary computer implemented method can include the steps of receiving a set of personal data from each of the plurality of remotely positioned users via a first data communication link and receiving a personal control ID from each of the plurality of remotely positioned users via a second data communication link to associate with the respective set of personal data and an ID instrument associated with the at least one of the plurality of users.

An exemplary computer implemented method according to an embodiment of the present invention can additionally include the steps of deriving, via the computer, a data profile from the set of personal data of the at least one of the plurality of remotely positioned users to be associated with the at least one of the plurality of users for use by at least one provider identified by a provider ID and receiving a request, responsive to when the point-of-transaction terminal is coupled via a third data communication link to the ID instrument associated with the at least one of the plurality of users, for at least a portion of the set of personal data of the at least one of the plurality of remotely positioned users from the retail point-of-transaction terminal remote from and in communication with the computer, the request including both the personal control ID of the respective user and a provider ID. Such a computer implemented method according to an exemplary embodiment of the present invention can also include the steps of providing a customized set of identification data based on the data profile associated with the one of the plurality of remotely positioned users to facilitate one or more retail transactions, which includes the use of one or more electronic coupons, through the retail point-of-transaction terminal, and redeeming, responsive to the customized set of identification data and coupon data associated therewith, the one or more electronic coupons for the one or more retail transactions. Beneficially, at least a portion of the coupon data can be associated with the at least one provider of components of data profiles.

Such a computer implemented method can further include the step of receiving via a fourth data communication link one or more coupons to be redeemed by the at least one of the plurality of users at a retail point-of-transaction terminal. Particularly, according to exemplary embodiments of the present invention, the fourth data communications link can include, for example, a wireless link, a wireline link, a wide area network link, an infrared link, a radio-frequency link, an optical link, and a magnetic link. Moreover, an exemplary computer implemented method according to an embodiment of the present invention can further include the steps of receiving user credentials from a provider of at least one component of the data profile, receiving coupon data from one or more providers of components of data profiles, associating the user credentials and the coupon data with a provider ID and the personal control ID, processing changes, updates, and additions to the user credentials and the coupon data to thereby define revised user credentials and revised coupon data in digitized either point-of-sale or point-of-transaction ready form, and updating the ID instrument associated with the at least one of the plurality of users with at least one of the revised user credentials and the revised coupon data.

Moreover, exemplary embodiments of the present invention can also include a computer readable program product stored in a tangible computer medium providing a customized set of identification data to facilitate a retail transaction at a retail point-of-transaction terminal. More specifically, such a computer readable program product can include, for example, instructions that when executed by a computer cause the computer to perform the operations of receiving a set of personal data from each of the plurality of remotely positioned users, receiving a personal control ID from each of the plurality of remotely positioned users to associate with the respective set of personal data and an ID instrument to be associated with the at least one of the plurality of users, and receiving a request for at least a portion of the set of personal data of the at least one of the plurality of remotely positioned users from the retail point-of-transaction terminal positioned remote from, and adapted to be in communication with, the computer. Particularly, the request can include, for instance, both the personal control ID of the respective user and a provider ID, and the provider ID, according to an exemplary embodiment of the present invention, can be associated with one of, or both, a merchant or service provider or at least one provider of components of data profiles. Additionally, the set of personal data can include coupon data associated with the one or more electronic coupons adapted to be redeemable by at least one of the plurality of users at a retail point-of-transaction.

Such an exemplary computer readable program product can additional include instructions that when executed by the computer cause the computer to further perform the operations of providing a customized set of identification data responsive to a data profile derived from the set of personal data of the at least one of the plurality of remotely positioned users to facilitate one or more retail transactions, which includes the use of one or more electronic coupons, through the retail point-of-transaction terminal, and redeeming, responsive to the customized set of identification data and the coupon data associated therewith, the one or more electronic coupons for the one or more retail transactions. Additionally, the computer readable program product can further include instructions that when executed by the computer cause the computer to further perform the operation of receiving, via a data communication link, one or more coupons to be redeemed by the at least one of the plurality of users at the retail point-of-transaction terminal.

According to exemplary embodiments of the present invention a data communications link can include, for example, a wireless link, a wireline link, a wide area network link, an infrared link, a radio-frequency link, an optical link, and a magnetic link. Moreover, a wide area network link can include, for example, the Internet. Also of benefit, a personal control ID can Include a subscriber identity module ID number associated with an ID instrument that is associated with at least one of a plurality of users. A set of personal data can also include, for instance, a membership ID indicating that a user presenting an associated ID instrument is a member of a particular user network and is accordingly authorized to access a particular retail point-of-transaction terminal and user credentials associated with at least one provider of components of data profiles. Additionally, a customized set of identification data can also include, for example, a membership ID.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 1 is a track layout in accordance with one aspect of the present invention;

FIG. 2 is a layout of the conventional ISO track diagram;

FIGS. 3, 4, and 5 are more detailed descriptions of the track layout under a standard ISO-8711 standard;

FIG. 6 is a transaction flow chart of a process for associating identification and personal data in accordance with an embodiment of the present invention;

FIG. 7 is a schematic block diagram of a system to provide a customized set of identification data to facilitate a transaction according to an embodiment of the present invention;

DETAILED DESCRIPTION

Figure 8:
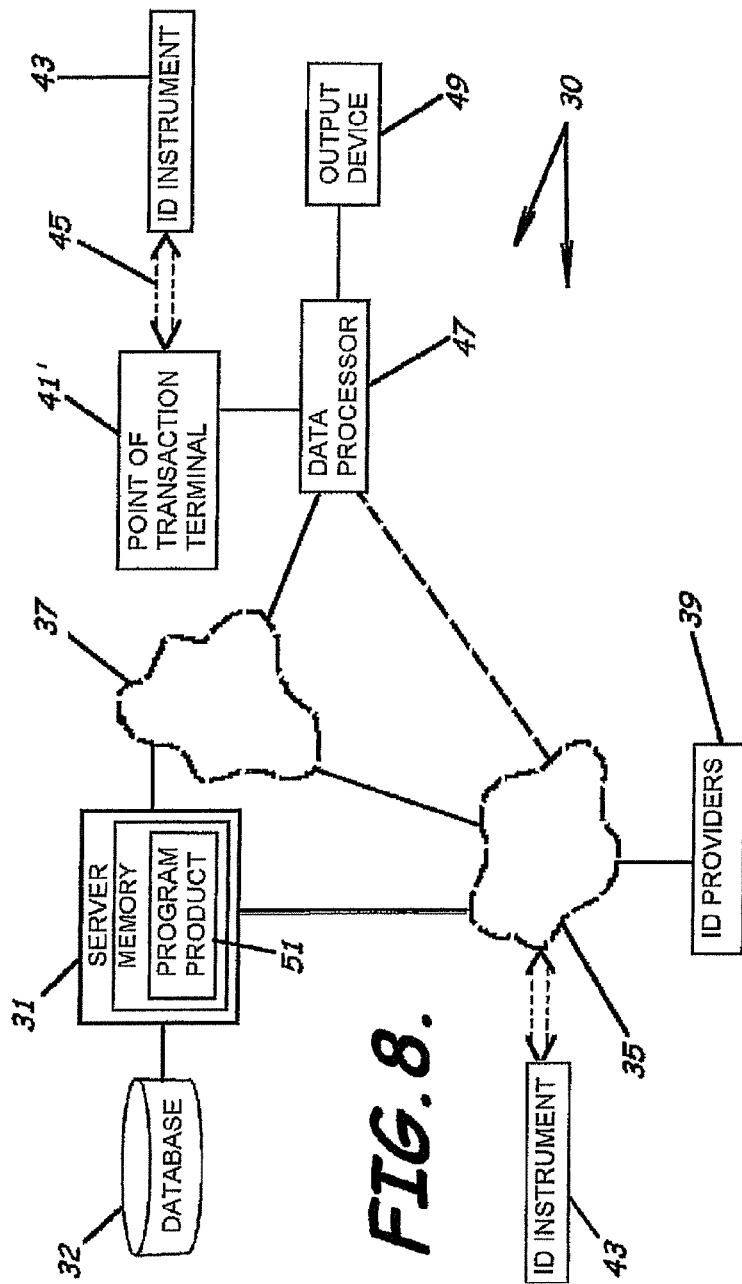
FIG. 8 is a schematic block diagram of a system to provide a customized set of identification data to facilitate a transaction according to an embodiment of the present invention.

The present invention will now be described more fully hereinafter with reference to the accompanying drawings, which illustrate embodiments of the invention. The present invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Applicant has discovered that there are many instances whereby an individual, consumer, entity, organization, etc., would find it desirable to provide others with a secure, customized set of identification data that would facilitate a transaction, facilitate an event of a specific type, or both. Using the basic principles of the present invention, as described in the above referenced prior filed patent of Applicant, the process is thus described. Referring first to the description and drawings of the above referenced patent issued to Applicant, it may be seen that FIG. 1 herein shows that an additional timing track 10 can be employed on a card 20 in an embodiment of the present invention which may be used to ameliorate the need of an optical encoder in a device, such as the wallet consolidator, discussed above, or in other types of readers. This is provided in that most conventional magnetic stripe readers use a mechanical sensor or optical sensor, which is used to detect the speed at which the magnetic stripe card is being read through the stripe reader. By having an additional timing track supplied as an additional track, the inventor herein has provided a means by which the reader can be made at a lower cost by using the timing track herein to determine the timing arrangement. However, this additional timing track 10 is not necessary for the operation of this embodiment of the present invention, and in fact, the conventional encoding and timing mechanism are quite satisfactory.

One of the significant features of an embodiment of the present invention is that multiple stripes from various credit cards can be read and consolidated onto one card as is set forth in the aforementioned wallet consolidator patent application. One of the unique features of this embodiment of the present invention is the ability to take foreign or other sources and to add that material onto a given track on the card. The wallet consolidator uses the individual memory chip or smart chip contained on a card to store information, however, this information can also be temporarily stored in the memory of a device such as the wallet consolidator and added to the magnetic stripe. One of the unique features of Applicant's invention is the use of the fact that a standard track of one card data format has an amount of information, which is known as discretionary data which can be placed on any given card in any one of the standard three tracks. By using control codes to indicate that the track is in a different format, using these control codes to "bracket" an individual stream of data, and placing these control codes after a standard stop sentinel on a data track, a conventional reader would inherently ignore the information contained within this section. However, a specially constructed reader/writer would be able to look for, or create, these special control codes, or the software within the conventional reader could be altered so that upon recognition of these special control codes, this additional information could be decoded. This allows for a "hiding" of additional information, which can be consolidated onto a given card to be employed and used in a very expeditious manner. Further, it will be understood that the sentinels, described above, need not be employed to practice this embodiment of the present invention, and that other types of software codes can be used so that point-of-sale ("POS") and other point-of-transaction (POT) terminals, either as they exist today, or with custom reprogramming, can be used to read the additional or foreign information that is to be "added" to conventional tracks. The start and stop sentinels have been described herein as only an example of the types of control codes that can be used to bracket the foreign data that is to be added to the card stripe. Further, a control code could be programmed into the stripe that can be recognized by the POS/POT reader to indicate that this is, for example, a credit card; a second code could indicate that this is a discount or affinity card; and yet a third code could indicate that this is a driver's license. These codes could also be combined in various ways. Prior art systems have not used these special control codes to effectively hide additional data on a given track. This additional information can be used effectively.

This can be made more clear when one reviews FIGS. 3, 4 and 5 which shows the significant amount of space that is available for "either discretionary data or additional data" on a given track. This is especially true when the 210 bpi track is used. The additional either alpha numeric or numeric characters provide a significant amount of space for additional data to be placed on a given card, which has been unavailable in prior art systems. Additionally, as the control code can be used to effectively "shift" the track concentration from 75 to 210 bpi in the middle of the track, additional information can be "hidden" and still be provided to a specially outfitted or programmed reader. Accordingly, additional data can be used and can be present on a card which generally would not be readable without the proper equipment or programming.

Referring now to FIG. 6, there is shown a transaction flow chart of a process for associating identification and personal data utilizing the system described above with regard to FIGS. 1-5. As stated above, there are many instances whereby an individual, consumer, entity, organization, etc, would find it desirable to provide others with a secure, customized set of identification (ID) data that would facilitate a transaction, facilitate an event of a specific type, or both. Additionally, the receiver of the data for the transaction may wish to provide complimenting and supplemental data back to the originator of the transaction. All such transactions can be done in a digitized format to be interpreted, manipulated and/or displayed on POS/POT devices/computers both at the POS/POT and remotely. Additionally, the process of initializing this secure transaction would be more flexible if the acceptors of the transaction could utilize a magnetic stripe card that could combine a unique identifying code with the standard ISO data from other completely different financial or other card's magnetically striped data.

FIG. 6 visually illustrates an example of such a transaction as follows:

Individual A would transmit via computer/communication line, his or her personal data, to a remote computer, e.g., server 31, in this case, a downloaded or scanned personal image, a downloaded or read driver's license from a public authority, a checking account number, a credit card, a debit card from a financial institution, and a supermarket frequent purchaser card.

Through server prompted instructions, the individual would be asked to select a password to protect his data, then further prompts could permit him to associate, if he so desired, certain identification and/or purchasing (credit/debit/checking account) data with particular transaction types, merchants, etc. In this example, individual A could link the image, driver's license, checking account data and frequent purchaser card data with transactions driven by, for example, a supermarket with which individual A holds the frequent purchaser card.

When shopping at the supermarket chain, individual A could present a magnetically striped card, smartcard, or radio-frequency or infrared PDA transmitted personal control ID number. The store POS 41 would read the data, communicate ultimately with the central server 31, and retrieve a customized set of identification data including the image of the purchaser, which could be displayed on the store POS screen; and the purchase would be confirmed with buyer and seller.

The supermarket can transmit the purchase data back to the central server 31 including, as an example, an electronic coupon(s) for future purchases. The supermarket can be empowered by the individual to also transmit at any time to the server 31 other coupons, discounts offers, and/or communications which could be read via the Internet or POS/POT and/or redeemed by the customer for future purposes. The supermarket can also receive and process changes, updates, and additions with respect to the supermarket frequent purchaser card and/or those from other service providers 39. The system could be expanded to include, by way of examples, membership ID's admittance, hospital, medical insurance, event ticketing, and/or money transfer type of transactions. In this fashion, an individual and/or entity could minimize portability issues and facilitate complex identification needs such as biometrics, imaging, and fingerprint technologies.

As shown in FIGS. 6, 7 and 8, an embodiment of the present invention can include a retail and/or other point-of-transaction system 30 to provide others with a secure, customized set of identification data that would facilitate a transaction, facilitate an event of a specific type, or both, such as, for example, that related to goods, services, grocery items, food, medical services and supplies, insurance premiums, ticketing, a money transfer, and identification services relating to a person/customer. The system 30 can include a computer, e.g., server 31, configured to store a plurality of personal control IDs and a plurality of sets of personal data associated therewith. A database 32 in communication with the server 31 can provide for such storage. Note, the server 31 shown schematically, for example, in FIGS. 6, 7 and 8, represents a server or server cluster or server farm and is not limited to any individual physical server or computer. The number of servers along with associated storage capacity and their architecture and configuration may be increased based on usage, demand, and capacity requirements for the system 30.

The personal data can include, for example, a personal name, a personal ID to be associated with the personal data, a pictorial image of the person, personal fingerprint data, personal checking account data, driver's license data of the person, personal biometric data, a personal social security number, a personal ID password, a personal data password, credit card data, debit card data, prepaid card data, frequent purchaser data, medical data, bank account data, investment data, coupon data, processed data, points, data based on existing personal data generated in response to a previous transaction, and membership IDs. This personal data can also be received from an ID provider 39 associated with the user such as, for example, a public authority, financial institution, or retail establishment management center; received from the user who received it from the ID provider 39; received directly from the user; or created internally by the administrator or maintainer of the server 31.

Each of the plurality of personal control IDs can be associated with a respective different person and with the respective set of personal data entered into the server 31, and can be controlled by the respective different person, e.g., via a user interface device 33 or ID instrument 43, such as, for example, a personal computer, personal digital assistant (PDA), cellular telephone, or other user communication device, that is in communication with a computer and/or communication network 35, e.g., the Internet, wireless, or wireline communication medium, or via a point-of-transaction connected to either the communication network 35 or a local area network 37 interfaced with the network 35 and/or server 31.

The server 31 is also configured to store a data profile derived from a set of personal data associated with a personal control ID identifying a selected different person and assembled together by the selected different person for use by a selected one of one or more ID providers 39 identified by a, provider ID. The provider ID can be used to identify a selected ID provider 39 to the server 31 to allow access thereto. Note, as perhaps best shown in FIGS. 8 and 10, the ID providers 39 including card/ID issuers can provide to the server 31 identification data, credit and debit card data, biometric data, and other changes, additions, and updates thereto through the communication network 35 (FIGS. 7 and 8). The server 31 can be configured to receive and process such changes, updates, and additions to components of data profiles/sets of personal data provided by the providers/issuers. This digitized data can be in POS/POT ready format when delivered to the server 31 or can be formatted after receipt, so that when received by the user, e.g., downloaded via a computer, PDA, or cellular phone, the data is properly formatted to be received and processed by a POS/POT terminal 41, 41', described in more detail below. After processing the changes, updates, and/or additions, the server 31 can then provide the data to the respective user. Processing can include the user accessing and/or modifying the data profile in response to the changes, updates, and/or additions. The data can be delivered over the communication network 35 and through an interface device 33 to the user's ID instrument 43 as shown, for example, in FIG. 7; directly to the ID instrument 43 if configured to interface with the communication network 35 as shown, for example, in FIG. 8; and/or through a radiofrequency server 61 for ID instruments 43 configured to receive radio transmissions as shown, for example, in FIG. 10.

According to an embodiment of the present invention, as perhaps best shown in FIG. 6, the ID providers 39 can also directly provide to the individual users: identification data, credit and debit card data, biometric data, and changes, additions, and updates thereto. Such data can be provided to the users, for example, directly through the communication network 35 to their respective ID instrument 43 or directly via a user interface device 33. When provided directly to either the ID instrument 43 or user interface device 33, the data should be in digitized, POS/POT ready form, so that when stored by an ID instrument 43, the data is formatted to be readily accessed and processed by the POS/POT terminal 41, 41'.

In order to derive the data profile, according to an embodiment of the system 30, a user having a personal control ID and password accesses the server 31 through the interface device 33, e.g., personal computer, PDA, or kiosk terminal, etc., or ID instrument 43 connected to a communication network 35, e.g., a wide area network including the Internet. The server 31, for example, through a graphical user interface, can present the user an ability to allow (assign) individual ID providers 39 selective access to the user's other personal data, typically required by the respective ID provider 39 for identification or authentication purposes. The server 31 can also provide the user the ability to assign or cross-link other ID provider data, e.g., credit or debit card credentials. Such assignment allows such additional credentials, not stored on the ID instrument 43, to be displayed upon access to, and authentication by, the server 31 through use of a personal control ID or other stored credentials at a point-of-sale or other point-of-transaction in accordance with the associated data profile, as described previously, and as described in more detail later. Such assignment can include details about each of the ID providers 39 including the provider name, location, and a date and time the provider associated credentials are to be activated or deactivated, and/or whether or not additional password or security data is required. The server 31 can also generate virtual credentials based on associations between the user and one or more ID providers 39, and between ID providers 39 including the administrator of the server 31, which can also be an ID provider 39.

According to an embodiment of the server 31, such cross-linking can allow access to the personal data in accordance with the data profile using the different credentials provided by different ID providers 39. For example, a vendor membership card in possession of the user previously configured as part of the user's personal data can allow limited access by a vendor to other personal data identified in accordance with a data profile such as, for example, an image of the user, driver's license number, credit or debit card number, or other form of identification, which can be used to allow access to vender peripheral devices such as, for example, a gate, security door, turnstile, gas pump lock, computer lock, ignition lock, and others known to those skilled in the art. Beneficially, this can allow a single identification device cross-linked to credentials otherwise contained on other devices or ID instruments 43 to allow the user access to physical facilities such as, for example, sporting events, secure facilities, prison or hospital visitor admittance, hospital nurseries, employee only portions of the facility, ATM devices, and self-service devices requiring identification, just to name a few. This can also allow the user access to virtual facilities such as, for example, access to multiple credit or debit card accounts issued by different ID providers 39 through use of a single issued credit or debit card, a member, employee or student ID, a driver's license, or other ID instrument 43.

The system 30 can also include multiple terminals, e.g., point-of-sale (POS) terminals 41 or other point-of-transaction (POT) terminals 41' (see FIGS. 6-8), adapted or otherwise positioned to couple to an ID instrument 43 via a data communication link 45, e.g., a wireless link, a wireline link, wide area network (WAN) link, an infrared (IR) link, a radio-frequency (RF) link, an optical link, or a magnetic link, to receive from the ID instrument 43 the personal control ID identifying the selected different person. The POS/POT terminals 41, 41' can be also positioned to send the personal control ID identifying the selected different person to the server 31, for example, through or via a data processor 47 which can be configured to transmit transaction ID information containing information needed to execute the transaction, the personal control ID identifying the selected different person, and the provider ID which can be used to identify a selected ID provider 39.

The POS/POT terminals 41, 41' (FIGS. 6, 7, 8, and 10) can include, for example, a magnetic card reader, a smart card reader, a bar code reader, an infrared (IR) receiver, an optical scanner, a transmitter adapted for transmitting a pre-determined signal for activating a response from an RF identification (RFID) tag 57 (see, e.g., FIG. 9) and for receiving a response back from the RFID tag 57, and an interface adapted for receiving RF signals from at least one of a cell phone and an RF device. The ID instrument 43 can include a magnetically striped card, smartcard, a bar code, a gift card, an automatic teller machine (ATM) card, a check card, a wallet consolidator, a debit card, a credit card, a smart card, a prepaid card, a personal identification card, a driver's license, a personal computer (PC), a laptop computer, a personal digital assistant (PDA) adapted for radio-frequency (RF) or infrared (IR) communication, a check, a keypad, a touch screen, a voice recognition device, a radio-frequency (RF) device including an RFID tag 57 such as a cell phone or other data communication device capable of storing and transmitting personal data. Note, the RFID tag 57 can function as an equivalent for the magnetic stripe on various security, credit, debit, and/or gift cards, for example, but with added functionality including a larger storage capacity, faster access to the data, and generally no need for actual physical contact with an electronic reader, e.g., terminal 41, 41' or interface device 33.

The server 31 correspondingly can be further configured to retrieve from the plurality of sets of personal data the data profile derived from the set of personal data associated with the personal control ID identifying the selected different person in response to receiving the personal control ID, and to transmit to the data processor 47 or POS/POT terminal 41, 41' the data profile for use by the selected provider identified by the provider ID. Beneficially, this can be accomplished for a plurality of persons, providers, and transactions. For example, a user having at least one ID instrument 43 associated with the user's personal data and a member of the network of users associated with the server 31 arrives at a transaction site, e.g., convenience store gas pump, facility having a security gate, supermarket checkout counter, etc. The user then engages any one of the ID instruments 43 associated with the specific user in communication with the terminal 41, i.e., the user "swipes" the ID instrument 43 through a card reader portion of the terminal 41 if in the form of a magnetic card or passes the ID instrument 43 over a near field transmitter if in the form of a RFID tag, for example. Identification data, e.g., personal control ID, read from the ID instrument 43 is passed through a data processor 47 to the server 31. The server 31 uses the credentials extracted from the ID instrument 43, looks up those credentials in the database 32, and identifies the user as a member of the network of users.

According to an embodiment of the present invention, the server 31 is configured to recognize that the personal control ID is being received prior to transmitting to the data processor 47 the data profile derived from the set of personal data associated with the personal control ID identifying the selected different person. The server 31 is also configured to provide the data profile to the selected provider to thereby verify the personal control ID as being associated with a use of the personal control ID prior to proceeding with the transaction. For example, if the transaction site is an unmanned facility having peripheral devices such as a security gate or gas pump, the indication that the user is a member can be provided to allow unlocking of the peripheral device and/or allow for logging access to the peripheral device by the user. The log can include the name of the vendor, location, date, and time of the transaction, which can be maintained at the transaction site via the data processor 47 or can be maintained at the server site by the server 31. When maintained by the server 31, the user can be provided access via the interface device 33, e.g., personal computer or PDA, or a "smart" ID instrument 43 to allow monitoring of transactions under the user's personal control ID or other user credentials. Note, the log function applies to both unmanned and manned transactions. Note also, no transaction needs to take place in order for the server 31 to perform the log function. According to an embodiment of the system 30, only receipt of the personal control ID or other user credentials by the server 31 is required.

Beneficially, such function can be applied to track access to portions of a self-service type facility to help reduce theft and/or to improve treatment of a facility, i.e., the user knows that the user is not anonymous but can be identified and held accountable for any damage. Such function can also be utilized with self-service devices to help reduce theft and improve treatment of the device. For example, traditionally many gas station convenience stores enable their gasoline pumps via visual contact with the customer but without obtaining actual identification that would be transferable to authorities should the customer fail to pay for the gasoline. A proprietary gas service card or the identification data contained therein can be provided to the user. Use of a card or other ID instrument 43 containing such identification data can be required in order to unlock the pump if a payment card is not to be used. Upon "swiping" the gas identification card or other ID instrument 43, the pump terminal 41 can transmit the user credentials to a data processor 47, typically located in the convenience store, which can request transaction confirmation from the server 31. The server 31 can perform the look-up of the user credentials and identify the user as a member of the network of users. The data processor 47 can then enable access to the gasoline pump responsive to the confirmation. Depending upon the data profile and/or capability of the gasoline terminal 41, a preselected credit or debit card, in the form of the associated transaction information contained therein, can be displayed on output device 49, e.g., video terminal, and can be virtually accessed to pay for the gasoline.

Alternatively, currency, or another payment card, can be utilized. Further, the transaction can be logged and the user identification, provider location, and date and time of the transaction, can be associated with the logged event.

This log function can also allow the owner of the personal control ID to track authorized or unauthorized usage including tracking the name, location, and a date and time the provider or point-of-transaction terminal requested identification confirmation. Beneficially, this can allow for automated monitoring of related persons having an ID instrument 43 with access to the personal control ID or other credentials of the user, and automated monitoring of the movement of pets or possessions carrying an ID instrument 43 containing the personal control ID or other credentials of the user. Beneficially, portions of the log can be retrieved and e-mailed or otherwise transmitted to selected e-mail addresses, e.g., law-enforcement, medical provider, etc.

If the transaction site is a manned facility, in accordance with the data profile, the server 31 can return to a data processor 47 and/or output device 49 at the transaction site, e.g., video display, personal data associated with the user, e.g., a driver's license or other ID, photograph of the user, fingerprint of the user, and/or an indication that the user is a member associated with credentials necessary to access the transaction site. The transaction site operator can then view the user's driver's license and photograph to allow visual confirmation that the user is the user associated with the ID instrument 43 prior to authorizing completion of the transaction. If the point-of-transaction is a point-of-sale, such as in this illustration, and if authorized in accordance with the data profile, associated payment credentials, e.g., credit or debit card information, can be displayed on the video display to allow easy selection of the payment method.

Figure 9:
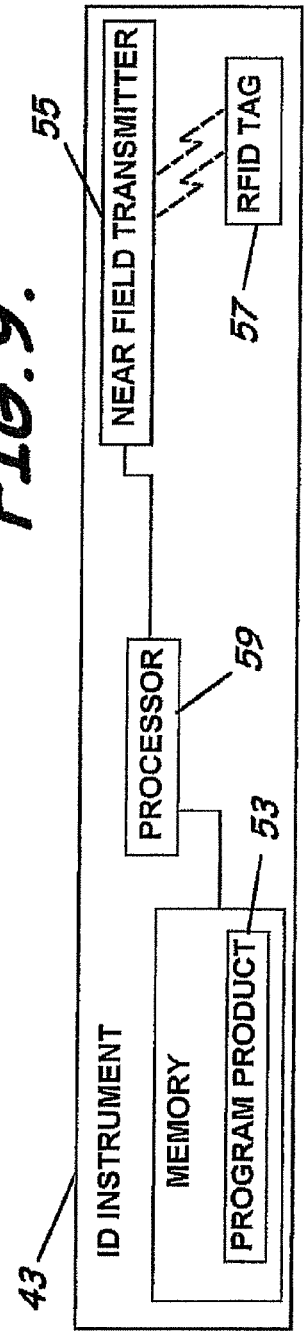
FIG. 9 is a schematic block diagram of an ID instrument to provide a customized set of identification data to facilitate a transaction according to an embodiment of the present invention.

Traditionally ID instruments 43 have been almost exclusively in the form of cards having magnetic stripes. RFID technology, however, can provide for containment of substantially more information than could otherwise be carried by the traditional magnetic stripes. According to an embodiment of the present invention, the ID instrument 43 can be in the form of a common hand-held electronic device already in use for other purposes. Accordingly the ID instrument 43, e.g., a cell phone, PDA, or other similar device, can include an RFID tag or circuit 57 (FIG. 9). A main transmitter of the device can be adapted to provide extremely short-range transmissions, or as shown in FIG. 9, a separate near field transmitter or transceiver circuit 55 can be positioned within, or adjacent and coupled to, the ID instrument main circuitry, e.g., processor 59, to communicate with the onboard or attached RFID tag/circuit 57 to read data from and/or write data to the RFID tag 57. This can provide for storing, adding, or updating personal data and/or portions of the data profile or other user credentials to the ID instrument 43. As noted previously, the data can be initially received directly from an ID provider 39 (see, e.g., FIG. 6) or through the server 31 (see, e.g., FIGS. 6 and 10) in POS/POT ready form. Note, the data can be encrypted, as known and understood by those skilled in the art, when transmitted over a network 35, 37, to help ensure secure usage.

According to an embodiment of the ID instrument 43, the data can not only be accessed for use at a POS/POT terminal 41, 41', but the data can also be directly or indirectly accessed by the main ID instrument circuitry, e.g., cell phone processor 59, near field transceiver 55, and transmitted over a network 35, either directly or via one or more interface devices 33, to another user, e.g., family member or trusted individual. Such functionality allows the other user to utilize the personal data and/or portions of the data profile, e.g. personal ID and/or PIN number, credit or debit card balance, etc., using that respective user's ID instrument 43 at a POS/POT terminal 41, 41', to thereby complete a sale or transaction with a merchant or service provider associated with the POS/POT terminal 41, 41', and/or the ID provider 39, or with an associated service provider such as, for example, a separate financial institution, medical facility, security facility, etc. In yet another embodiment of the ID instrument 43, data such as the personal control ID and pin number can be encrypted and transmitted over the network 35 directly or via one or more interface devices 33 to another user to allow the other user to access and retrieve at least a portion of the set of personal data and/or data profile from the server 31 to allow the other user to utilize the personal data and/or portions of the data profile using that respective user's ID instrument 43 at a POS/POT terminal 41, 41'. In either of these embodiments, rather than transfer data directly from the ID instrument 43, the data can be provided to the interface device 33, e.g., PDA or personal computer, if not already located thereon, and transferred accordingly.

The system 30 can also include an output device 49 connected to or otherwise in communication with data processor 47 and/or point-of-transaction terminal 41' to receive from the data processor 47 the data profile received from the server 31 and to output the data profile to the selected provider to thereby verify the personal control ID as being associated with a user of the personal control ID at the point-of-transaction prior to proceeding with the transaction. The output device 49 can be further configured for generating information relating to the selected person in response to receipt of personal data associated with the selected personal control ID for the purposes of facilitating the transaction and facilitating the generation of transactional data and other customer messages via the Internet or point-of-transaction. According to an embodiment of the present invention, the output device 49 can be configured to generate incentives for making future purchases to the selected user in response to receipt of personal data related to the selected personal control ID. The incentives can include, for example, a coupon and/or a discount offer, and the output device 49 can include, for example, a visual display monitor and a printer. Note, according to an embodiment of the present invention, the data processor 47, POS/POT terminal 41, 41', and the output device 49 can be integrated together to constitute a substantially integrated input/output device.

Embodiments of the present invention can also include methods of using the system 30 to provide a customized set of identification data to facilitate a transaction. For example, a method can include first preparing the system 30 to facilitate transactions by first receiving a set of personal data of a user, requesting and/or receiving a personal control ID from the user to associate with the set of personal data, and storing the personal control ID and set of personal data in a database 32 in communication with a remote computer server 31. The user can access the set of personal data over the communication network 35, e.g., Internet, and derive a data profile using an interface devices 33, e.g., a personal computer or PDA, or using the ID instrument 43, depending upon the configuration, i.e., if capable of such communication. The data profile can restrict a particular ID provider to only user credentials provided by that ID provider or can allow access to user credentials from a plurality of ID providers. After receiving or loading an ID instrument with a personal control ID and/or personal data, the user may then visit a point-of-sale 41 or other point-of-transaction 41' for purposes of conducting a transaction. As such, the method can include acquiring the personal control ID of the user from an ID instrument 43, submitting a request to the server 31 for at least a portion of the set of personal data of the user along with both the personal control ID of the user and provider ID, and providing a customized set of identification based on a data profile derived from the set of personal data of the user for use by the provider identified by the provider ID to identify the user. If the POS/POT terminal is associated with a peripheral device, i.e., a switch controlling hardware necessary to complete the transaction, the steps can include manipulating the associated peripheral device in response to receipt of the customized set of identification data.

Figure 10:
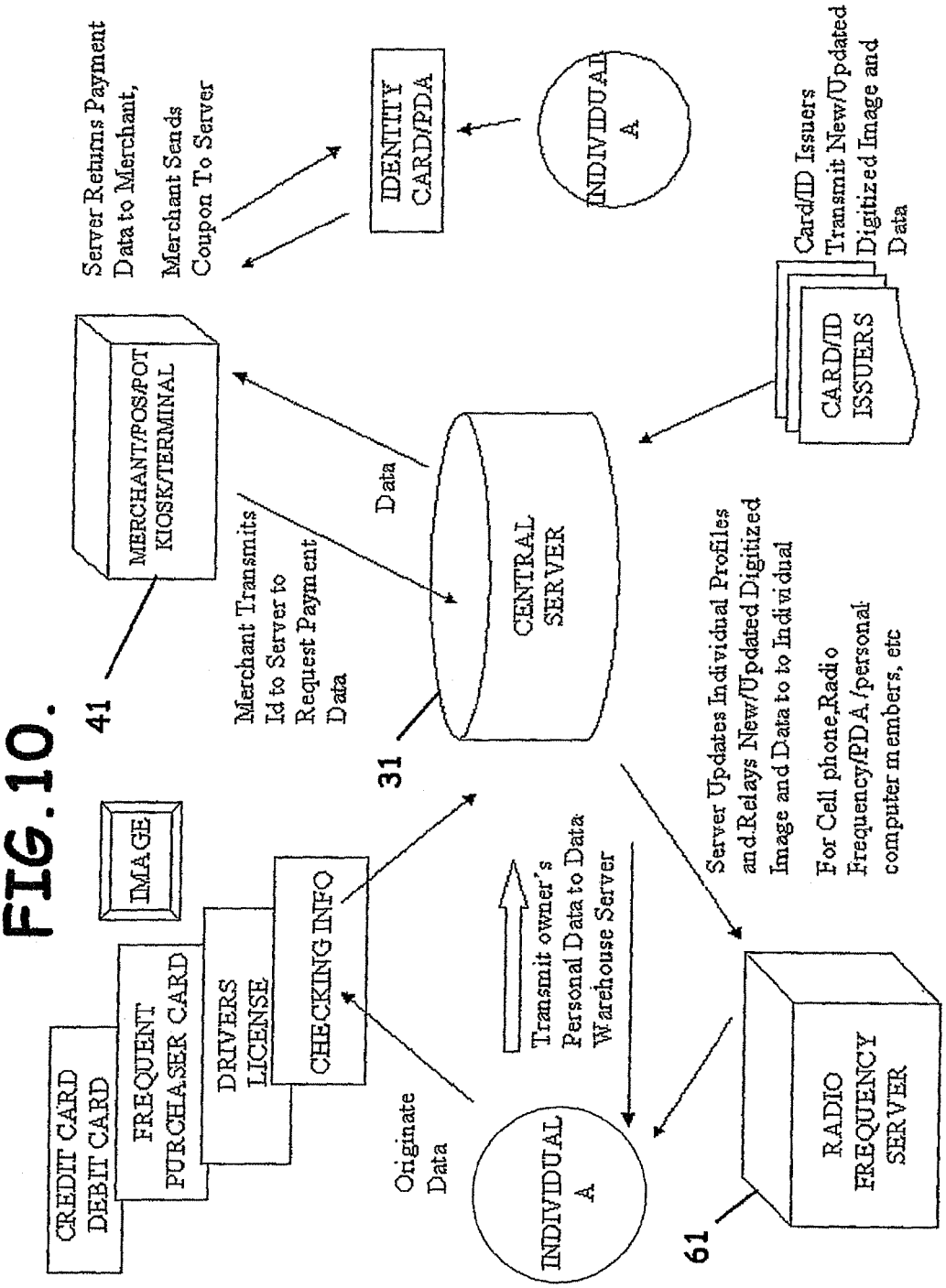
FIG. 10 is a transaction flow chart of a process for receiving and forwarding identification and personal data according to an embodiment of the present invention.

As shown in FIGS. 6-9, an embodiment of the method can include an ID provider 39 providing personal data and/or a portion of the personal data or data profile including, for example, an account number, expiration date, and/or pin number for a debit or credit card or bank account, security identification number for a security badge, medical information, biometric information and/or other access credentials either directly to a user ID instrument 43 or via user interface devices 33 through communication network 35, for example, in digitized, POS/POT ready form. Alternatively and/or additionally, as shown in FIG. 10, the access credentials can be provided to a computer, e.g., server 31, for later access and/or downloading by the user. Beneficially, if the access credentials are not already in POS/POT ready form, the server 31 can convert the data into such form prior to the accessing and/or downloading by the user, e.g., owner of the credentials. Once stored in the user ID instrument 43 in digitized, POS/POT ready form, the data can be readily used at a POS/POT terminal 41, 41', by the user. Additionally, the data can be forwarded to another ID instrument 43, such as, for example, one in the possession of another user, e.g., family or trusted member, for use at a POS/POT terminal 41, 41' by the other user.

According to an embodiment of the method, the forwarding can be either directly from the ID instrument 43 or via an associated interface device 33. Beneficially, such methodology negates the need for transferring individual identification instruments such as, for example, credit, debit, gift, or coupon cards, etc., but instead allows for the receipt of data otherwise stored on such cards. In another embodiment of the method, if not already stored on the server 31, the owner of the user credentials can transmit the user credentials or other personal data to the server 31 for access by another user. In this embodiment of the method, only basic server 31 access data need be transmitted to the other user to allow the other user to access portions of the personal data, data profile, or other user credentials from the server 31. Such methodology can allow for electronically transferring funds or credit between users, negating any need for actual currency transfer or even an actual point-to-point connection between users.

An embodiment of the method can include providing incentives to the user for making future purchases in response to receipt of personal data related to the personal control ID and/or a transaction between the user and a merchant. The incentives can include, for example, a coupon or a discount offer. Such incentives can be associated with the personal data of the user. Changes, updates, and additions from providers of components of data profiles can be received and processed.

Embodiments of the present invention can also include a program product 51 stored in memory of the server 31 and adapted to provide identification data to facilitate a transaction. The program product 51 can include instructions to perform the operations of receiving a set of personal data from a remotely positioned user, requesting and receiving a personal control ID from the user to associate with the set of personal data, and storing the personal control ID and set of personal data in a database 32 in communication with the server 31. The operations can also include receiving user access credentials either directly or indirectly from an ID provider 39, and associating the user credentials with a provider ID and a personal control ID. If the set of personal data, components of a data profile, or newly added, changed, or updated components or other credentials are not already in POS/POT ready form, the server 31 can convert the data into such form prior to transmitting the data to the user, e.g., owner of the credentials. The operations can also include deriving a data profile from the set of personal data of the user for use by an ID provider 39, e.g., and a point-of-transaction. This can include associating components of the data profile derived from a plurality of ID providers, e.g., multiple credit card providers, with components provided by a single credit card provider. The operations can also include creating virtual credentials or other personal data based on associations between the user and one or more ID providers 39 and between ID providers 39 including the administrator of the server 31 which can also be an ID provider 39.

The operations can also include receiving a request from a point-of-transaction terminal or associated. data processor for at least a portion of the set of personal data of the user along with both the personal control ID of the user and a provider ID, and providing customized information based on a data profile derived from the set of personal data of the user for use by the provider identified by the provider ID. Note, the memory of the server 31 can include volatile and nonvolatile memory known to those skilled in the art including, for example, RAM, ROM, and magnetic or optical disks, just to name a few. Note also, the program product 51 can be in the form of microcode, programs, routines, and symbolic languages that provide a specific set or sets of ordered operations that control the functioning of the hardware and direct its operation, as known and understood by those skilled in the art.

Embodiments of the present invention also include a program product 53 stored in memory of an electronic form ID instrument 43, e.g., PDA or cell phone, or interface devices 33, e.g., PDA or personal computer, adapted to provide identification data to facilitate a transaction. The program product 53 can include instructions to perform the operations of receiving a set of data from a remotely positioned ID provider 39, for example, an account number, expiration date, and/or pin number for a debit or credit card or bank account, security identification number for a security badge, medical information, biometric information and/or other user credentials, for example, in digitized, POS/POT ready form, either directly through a terminal associated with the ID provider 39 or through a communication network 35. Alternatively and/or additionally, the instructions can include those to perform the operation of retrieving/download the user credentials from a computer, e.g., server 31, having previously received such user credentials from the ID provider 39 or from the user.

The instructions can also include those to perform the operations of causing the user credentials to be transmitted from a first memory element within the ID instrument 43 to a second memory element, e.g., RFID tag 57. Once stored in ID instrument 43 in digitized, POS/POT ready form, the data, including the newly received user credentials and other personal data and/or data profile, can be readily used at a POS/POT terminal 41, 41' by the user or forwarded to another ID instrument 43 or interface device 33, such as, for example, one in the possession of another user, e.g., family or trusted member, for use at a POS/POT terminal 41, 41,' by the other user. That is, the instructions can also include those to perform the operation of transmitting or otherwise forwarding the user credentials to another ID instrument 43 or interface device 33.

According to an embodiment of the program product 53, the instructions can include those to perform the operation of transmitting the newly acquired user credentials or other personal data directly to the other ID instrument 43 over a communication network 35. In another embodiment of the program product 53, the instructions can include those to perform the operation of transmitting the newly acquired user credentials or other personal data to the server 31 for access by another user, if not already stored on the server 31. The instructions can also include those to perform the operation of transmitting basic server access data to the other user directly or through the server 31 to allow the other user to access the data from the server 31.

According to another embodiment of the system 30, rather than utilize or solely utilize a user selected or ID provider provided personal control ID, "smart" ID instruments 43, e.g., cell phones, PDAs, etc., can utilize other data components of the data profile to validate the user's identity for permission to access the data profile or can utilize a simple non-access identity in combination with device carried credentials, e.g., for off-line transaction purposes. For example, such device carried credentials can include: a subscriber identity module (SIM) ID number present in the SIM card of the smart device and/or embedded in the firmware of the smart device; registered electronic signatures of the various electronic components of the circuits utilized by the model of the smart device, e.g., the manufacturer ID, make, model and serial number; and other digitized firmware, and data that are unique to the specific smart device possessed by the owner of the data profile.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links.

According to an embodiment of the present invention, a computer readable medium that is readable by a computer, e.g., server 31, providing identification data to facilitate a transaction can include a set of instructions that, when executed by the server 31, cause the server 31 to perform the operations of receiving a set of personal data from a remotely positioned user, requesting and receiving a personal control ID from the user to associate with the set of personal data, and storing the personal control ID and set of personal data in a database 32 in communication with the server 31. The operations can also include receiving from a point-of-sale 41 or other point-of-transaction terminal 41', or associated data processor 47, a request for at least a portion of the set of personal data of the user along with both the personal control ID of the user and a provider ID, and providing customized information based on a data profile derived from the set of personal data of the user for use by the provider identified by the provider ID, for example, in identifying the user, verifying the identity of the user, and supplementing additional transactional information beyond that stored on the ID instrument, just to name a few. According to an embodiment of the present invention, instructions can also include those to perform the operations of providing incentives to the user for making future purchases in response to receipt of personal data related to the personal control ID and/or a transaction between the user and a merchant, and receiving and processing changes, updates, and additions from providers of components of data profiles.

According to an embodiment of the present invention, a computer readable medium that is readable by at least one processor, e.g., that associated with server 31, ID provider 39, and/or one or more ID instrument processors 59, can include a set of instructions that, when executed by the at least one processor, cause the at least one processor to perform the operations of providing user credentials to a first user by an ID provider 39 and storing the user credentials in the memory of a first ID instrument 43. The user credentials can include, for example, an account number, expiration date, pin number for a debit card, pin number for a credit card, pin number for a bank account, security identification number for a security badge, and biometric information. According to an embodiment of the present invention, the user credentials can be provided directly to the first ID instrument 43 through a communication network 35, 37, in digitized, point-of-sale or point-of-transaction ready form. According to another embodiment of the present invention, the user credentials are first provided to a computer, e.g., server 31, for later access by the first user, If the user credentials are not in point-of-sale or other point-of-transaction ready form, the server 31 can convert the user credentials thereto prior to the accessing by the first user. The instructions can also include those to perform the operation of making the data available to the user to allow the user to form a data profile indicating provider access attributes. This can include associating user credentials from a plurality of ID providers 39, i.e., portions of the set of personal data, with user credentials provided by a single ID provider 39 to allow access of components of the data profile attributable to the plurality of ID providers 39 using a single ID instrument 43 associated with one of the ID providers 39.

According to an embodiment of the present invention, the instructions can include those to perform the operation of forwarding the user credentials from the first ID instrument 43 to a second ID instrument 43 in the possession of a second user to thereby allow for receipt of data otherwise stored on the first ID instrument 43. The operation of forwarding can include transmitting the user credentials or other personal data by the first user via the first ID instrument 43 to the second user via the second ID instrument 43 and/or interface device 33. According to another embodiment of the present invention, the operation of forwarding can include transmitting the user credentials or other personal data by the first user to a computer, e.g., server 31, for access by the second user. Alternatively, the operation of forwarding can include transmitting only basic access data to the second user to allow the second user to access the data from the computer. In either methodology, the user credentials or other personal data can be transmitted to the second user to allow the second user to access electronic currency associated with the first user, to thereby transfer electronic currency between the first and the second users, negating any need for actual currency transfer.

This Application is related to U.S. patent application Ser. No. 12/359,927, filed on Jan. 26, 2009, For which a notice of allowance has been issued, U.S. patent application Ser. No. 11/929,592, filed on Oct. 30, 2007, now U.S. Pat. No. 7,516,886, U.S. patent application Ser. No. 11/394,314, filed on Mar. 30, 2006, now U.S. Pat. No. 7,357,312, U.S. patent application Ser. No. 11/130,765, filed on May 17, 2005, now U.S. Pat. No. 7,083,087, U.S. patent application Ser. No. 10/052,405, filed Jan. 17, 2002, now U.S. Pat. No. 6,938,821, U.S. patent application Ser. No. 09/664,205, filed on Sep. 18, 2000, now U.S. Pat. No. 6,402,029, U.S. patent application Ser. No. 09/618,407, filed on Jul. 18, 2000, now U.S. Pat. No. 6,293,462, and U.S. application Ser. No. 09/087,193, filed on May 29, 1998, now U.S. Pat. No. 6,131,811, all incorporated herein by reference in their entirety.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification. For example, the system and methods were described with respect to point-of-sale or other point-of-transaction terminals in concert with an ID instrument possessed by a user. Such system, however, can be applied to inanimate objects or animals. For example, the ID instrument can be connected to an article of clothing, personal articles or belongings being worn or carried, baggage, or an article being shipped, to allow such item to be properly directed or allow entry thereof. Also, for example, the ID instrument can be implanted in or carried by an animal to allow access through, e.g., a "doggie door" or other restricted access medium.

The invention claimed is:

1. A method of processing electronic coupons, the method comprising:
   receiving coupon data from a merchant;
   receiving identification data from a user;
   associating the identification data with the coupon data;
   electronically transferring the coupon data, as an electronic coupon, to the user in a format that is readable by a POS terminal at a merchant location;
   receiving from the merchant an indication that a user seeks to redeem the electronic coupon;
   verifying the electronic coupon is valid;
   sending to the merchant authorization to redeem the coupon; and
   sending to the merchant at least a portion of the identification data.

2. The method of claim 1, wherein the step of electronically transferring the coupon data comprises downloading the coupon data to a cellular telephone.

3. The method of claim 1, wherein the step of electronically transferring the coupon data comprises downloading the data in a format that can be read by a bar code scanner.

4. The method of claim 1, wherein the identification data includes a user's name and a user's personal ID.

5. The method of claim 1 wherein the step of electronically transferring the coupon data to the user in a format that is readable by a POS terminal at the merchant location comprises displaying the coupon data in a bar code readable format.

6. A method of processing electronic coupons, the method comprising:
   receiving coupon data from a merchant;
   receiving identification data from a user, wherein the identification data includes a user's name, a user's personal ID, and a membership ID
   associating the identification data with the coupon data;
   electronically transferring the coupon data, as an electronic coupon, to a cellular telephone of the user in a format that is readable by a bar code scanner at a POS terminal at a merchant location;
   receiving from the merchant an indication that a user seeks to redeem the electronic coupon;
   verifying the electronic coupon is valid;
   sending to the merchant authorization to redeem the coupon; and
   sending to the merchant at least a portion of the identification data.

7. A system for processing electronic coupons comprising:
   a database configured to store coupon data of a merchant that is associated with a data profile of a user, the data profile including personal data of the user; and
   a server configured to access the database and configured to be accessible over a communications network, the server running instructions to
      upload the coupon data to the user in a format that is readable by a point-of-transaction terminal at a merchant location;
      receive from a merchant an indication that the user desires to redeem the coupon; and
      provide to the merchant confirmation to redeem the coupon based at least in part upon the user data associated with the coupon data.

8. The system of claim 7 further including instructions to: provide to the merchant at least a portion of the data profile.

9. The system of claim 7 wherein the data profile includes personal identification data and personal financial data.

10. The system of claim 9 wherein the personal financial data includes data selected from the group consisting of credit card data, prepaid card data, debit card data, frequent purchaser data, bank account data, and combinations of the above.

11. The system of claim 7 wherein the server is maintained by the merchant.

12. The system of claim 7 wherein the data profile further includes data generated in response to previous transactions by the user.

* * * * *